US011060987B2

(12) United States Patent
Lu et al.

(10) Patent No.: US 11,060,987 B2
(45) Date of Patent: Jul. 13, 2021

(54) METHOD AND APPARATUS FOR FAST SCATTER SIMULATION AND CORRECTION IN COMPUTED TOMOGRAPHY (CT)

(71) Applicant: Canon Medical Systems Corporation, Otawara (JP)

(72) Inventors: Yujie Lu, Vernon Hills, IL (US); Zhou Yu, Wilmette, IL (US); Richard Thompson, Hawthorn Woods, IL (US)

(73) Assignee: Canon Medical Systems Corporation, Otawara (JP)

( * ) Notice: Subject to any disclaimer, the term of this patent is extended or adjusted under 35 U.S.C. 154(b) by 74 days.

(21) Appl. No.: 16/392,177

(22) Filed: Apr. 23, 2019

(65) Prior Publication Data
US 2020/0340932 A1  Oct. 29, 2020

(51) Int. Cl.
*G01N 23/046* (2018.01)
*G06N 20/00* (2019.01)
(Continued)

(52) U.S. Cl.
CPC .............. *G01N 23/046* (2013.01); *G06N 3/08* (2013.01); *G06N 20/00* (2019.01); *G01N 2223/401* (2013.01); *G01N 2223/413* (2013.01)

(58) Field of Classification Search
None
See application file for complete search history.

(56) References Cited

U.S. PATENT DOCUMENTS 10,593,070 B2 * 3/2020 Lu ..................... A61B 6/032
2017/0052975 A1 * 2/2017 Madenci ............. G06F 16/538
(Continued)

FOREIGN PATENT DOCUMENTS

EP        2009592 B1 * 3/2013 .......... G06T 11/005
WO   WO 2009/042747 A1   4/2009

OTHER PUBLICATIONS

Lu et al., "A deterministic integral spherical harmonics method for scatter simulation in computed tomography," Proc. SPIE 10132, Medical Imaging 2017: Physics of Medical Imaging, 101322H (Mar. 9, 2017); doi: 10.1117/12.2254145 (Year: 2017).*
(Continued)

*Primary Examiner* — Soo Shin
(74) *Attorney, Agent, or Firm* — Oblon, McClelland, Maier & Neustadt, L.L.P.

(57) ABSTRACT

X-ray scatter simulations to correct computed tomography (CT) data can be accelerated using a non-uniform discretization of the RTE, reducing the number of computations without sacrificing precision. For example, a coarser discretization can be used for higher-order/multiple-scatter flux, than for first-order-scatter flux. Similarly, precision is preserved when coarser angular resolution is used to simulate scatter within a patient, and finer angular resolution used for the scatter flux incident on detectors. Finer energy resolution is more beneficial at lower X-ray energies, and coarser spatial resolution can be applied to regions exhibiting less X-ray scatter (e.g., air and regions with low radiodensity). Further, predefined non-uniform discretization can be learned from scatter simulations on training data (e.g., a priori compressed grids learned from non-uniform grids generated by adaptive mesh methods).

20 Claims, 15 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 2018/0014806 A1* | 1/2018 | Lu | A61B 6/032 |
| 2018/0235562 A1* | 8/2018 | Petschke | A61B 6/032 |
| 2020/0234471 A1* | 7/2020 | Lu | G06T 11/005 |
| 2020/0340932 A1* | 10/2020 | Lu | G06N 20/00 |

OTHER PUBLICATIONS

Todd A. Wareing, et al. "Discontinuous Finite Element Sn Methods on 3-D Unstructured Grids"; 45 pgs.

Hao Gao, et al.; "Parallel Multigrid Solver of Radiative Transfer Equation for Photon Transport Via Graphics Processing Unit"; Journal of Biomedical Optics 17 (9), 096004, Sep. 2012; 7 pgs.

J. Patrick Jessee, et al.; "An Adaptive Mesh Refinement Algorithm for the Radiative Transport Equation"; Journal of Computational Physics 139, 380-398 (1998), Article No. CP975870; 19 pgs.

Yousef Saad, et al.; "Iterative Solution of Linear Systems in the 20-th Century"; 29 pgs.

"Ultra-fast scatter simulation algorithm"; Knock-Out Search Report; Oct. 15. 2018; 25 pgs.

Alessandro Bevilacqua, et al.; " a new approach to Positron Emission Tomography (PET) image reconstruction using Artificial Neural Networks (ANN)"; International Journal of Modern Physics C; vol. 9. No. 1 (1998); Nov. 2000; 16 pgs.

Yuwei Fan, et al.; "Fast algorithms for integral formulations of steady-state radiative transfer equation"; Feb. 12, 2018; 24 pgs.

K. Grella, et al.; "Sparse Tensor Spherical Harmonics Approximation in Radiative Transfer"; Oct. 13, 2010; Swiss Federal Institute of Technology Zurich; 34 pgs.

* cited by examiner

METHOD AND APPARATUS FOR FAST SCATTER SIMULATION AND CORRECTION IN COMPUTED TOMOGRAPHY (CT)

BACKGROUND

Field of the Disclosure

The present disclosure relates to model-based scatter estimation and scatter correction for computed tomography, and, more particularly, relates to various approaches to accelerate scatter estimation by, e.g., (i) interpolating to a spherical grid when simulating scattered fields that have been expanded as a series of spherical harmonics, (ii) using a coarser grid discretization for higher-order scatter to decrease a number of computations, (iii) applying different (e.g., coarser/finer) angular discretization when simulating bulk scatter in an object versus detection using an anti-scatter grid (ASG), (iv) using an a prior compressed grid having a spatially varying resolution/pixel pitch based on an preliminary computed tomography (CT) image, and (v) using non-uniform energy discretization.

Description of the Related Art

Artifacts are commonly encountered in clinical computed tomography and may obscure or simulate pathology. Among the many different types of computed tomography (CT) artifacts, scattered X-rays may produce imaging artifacts.

For example, these scatter-induced artifacts can manifest in a medical image as dark streaks between two high attenuation objects, such as metal or bone, with bright streaks at the periphery. These artifacts are due, in part, to X-ray photons that have been redirected following interaction with a tissue. In order to account for inaccuracies introduced by scattered X-ray photons, hardware-based and software-based solutions have been introduced. Regarding software-based solutions, the projection data from a CT scan can be used to simulate the X-ray scatter, and this simulated scatter can then be removed from the projection data, leaving only the primary beam. However, accurately simulating X-ray scatter can be time consuming. Therefore, improved methods that can more rapidly simulate X-ray scatter without significantly sacrificing accuracy are desired.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus and method for accelerated scatter estimation and scatter correction for computed tomography.

According to an embodiment, the present disclosure further relates to an apparatus, comprising processing circuitry configured to obtain projection data representing an intensity of X-ray radiation transmitted through an object and detected at a plurality of detectors, the projection data being obtained for a plurality of views corresponding to respective projection angles relative to the object, reconstruct, using the projection data, an image of the object to generate a spatial model of X-ray scatter from the object, simulate, for one or more views of the plurality of views, a scatter flux of the one or more views representing an intensity of scattered X-ray radiation detected a the plurality of detectors, the intensity of scattered X-ray radiation being determined using an accelerated method based on integrating a radiative transfer equation (RTE), and determine, using the simulated scatter flux of the one or more views, primary flux of the plurality of views, the primary flux representing an intensity of X-rays that have not been scattered, which are incident on the plurality of detectors, wherein simulating the scatter flux is accelerated, relative to methods that use a uniform discretization of the RTE, by non-uniformly discretizing the RTE.

According to an embodiment, the present disclosure further relates to an apparatus, comprising an X-ray source configured to radiate X-rays through an object space configured to accommodate an object to be imaged, a plurality of detector elements arranged across the object space and opposite to the X-ray source, the plurality of detector elements being configured to detect the X-rays from the X-ray source, and the plurality of detector elements configured to generate projection data representing an intensity of the radiated X-rays, and processing circuitry configured to reconstruct, using the projection data, an image of the object to generate a spatial model of X-ray scatter from the object, simulate, for one or more views of the plurality of views, a scatter flux of the one or more views representing an intensity of scattered X-ray radiation detected a the plurality of detectors, the intensity of scattered X-ray radiation being determined using an accelerated method based on integrating a radiative transfer equation (RTE), and determine, using the simulated scatter flux of the one or more views, primary flux of the plurality of views, the primary flux representing an intensity of X-rays that have not been scattered, which are incident on the plurality of detectors, wherein simulating the scatter flux is accelerated, relative to methods that use a uniform discretization of the RTE, by non-uniformly discretizing the RTE.

According to an embodiment, the present disclosure further relates to a method, comprising obtaining, by processing circuitry, projection data representing an intensity of X-ray radiation transmitted through an object and detected at a plurality of detectors, the projection data being obtained for a plurality of views corresponding to respective projection angles relative to the object, reconstructing, by the processing circuitry and using the projection data, an image of the object to generate a spatial model of X-ray scatter from the object, simulating, by the processing circuitry, for one or more views of the plurality of views, a scatter flux of the one or more views representing an intensity of scattered X-ray radiation detected at the plurality of detectors, the intensity of scattered X-ray radiation being determined using an accelerated method based on integrating a radiative transfer equation (RTE), and determining, by the processing circuitry and using the simulated scatter flux of the one or more views, primary flux of the plurality of views, the primary flux representing an intensity of X-rays that have not been scattered, which are incident on the plurality of detectors, wherein simulating the scatter flux is accelerated, relative to methods that use a uniform discretization of the RTE, by non-uniformly discretizing the RTE.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
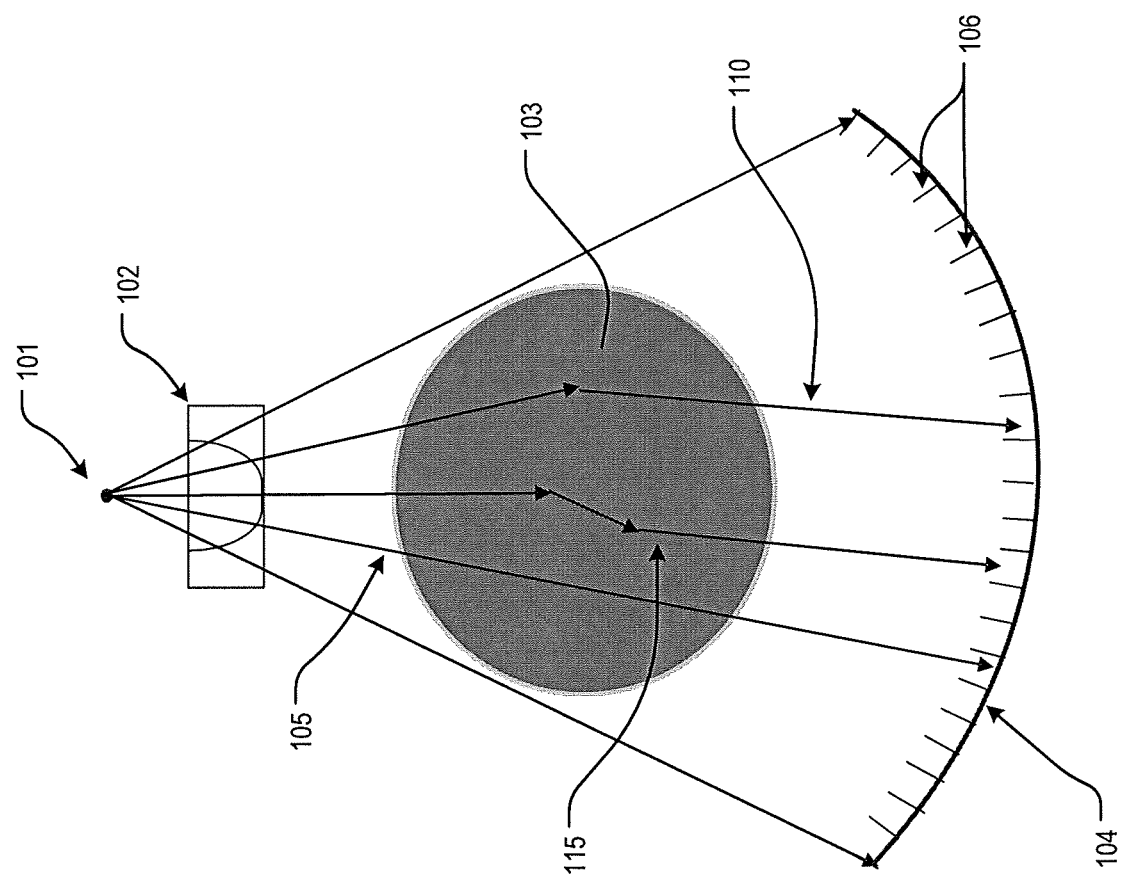
FIG. 1 is a diagram of X-ray scatter in a computed tomography scanner having an anti-scatter grid, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure relates to an apparatus and method to more rapidly simulate X-ray scatter by applying various acceleration techniques/approaches to more quickly perform a model-based scatter estimation that solves the radiative transfer equation (RTE).

The methods described herein apply insights regarding which variables in the RTE formulation of a scatter simulation can be coarse-grained (e.g., discretized at a coarser resolution) or discretized using a non-uniform distribution in order to provide faster performance with little to no degradation of the accuracy of the scatter simulation. Further, in certain implementations, the methods described herein apply insights regarding advantages with using spherical versus Cartesian coordinates for the discretization to accelerate the scatter simulation.

As discussed below, the first-order scatter can be simulated as $$\psi_1(\vec{r}, E, \hat{\Omega}) = \int_{\vec{r}_c}^{\vec{r}} d\vec{r}'$$
$$\int\int d\hat{\Omega}' dE' f(\vec{r}', E, E', \hat{\Omega} \cdot \hat{\Omega}') \psi_0(\vec{r}', E', \hat{\Omega}') \exp\left[-\int_{\vec{r}'}^{\vec{r}} d\vec{r}'' \mu(\vec{r}'', E)\right],$$

wherein $\psi(\vec{r}, E, \hat{\Omega})$ is the specific intensity of photon flux at point $\vec{r}$, E is an energy, and $\hat{\Omega}$ is a unit vector in the direction of propagation for the X-ray flux, and the subscript 1 in $\psi_1(\vec{r},E,\hat{\Omega})$ indicates the first-order scatter and the subscript 0 in $\psi_0(\vec{r}',E',\hat{\Omega}')$ indicates the zero-order scatter (i.e., the X-ray beam in the absence of scatter). Further, the vector $\vec{r}_c$ indicates a starting point for an X-ray path, and f($\vec{r}$',E,E',$\hat{\Omega}\cdot\hat{\Omega}$') is the scatter cross section, which includes both Compton and Rayleigh scattering for X-ray CT. Finally, the variable $\mu(\vec{r},E)$ represents the total attenuation coefficient for the X-rays at point $\vec{r}$ and energy E. In certain implementations, this integral equation is simulated discretizing the coordinates $\vec{r}$, E, $\hat{\Omega}$, $\vec{r}$', E', $\hat{\Omega}$', and $\vec{r}$'', and then solving numerically.

In certain implementations, the numerical solution of the RTE is accelerated by using a non-uniform discretization. For example, the energy variables E and E' can have a non-uniform discretization (e.g., finer discretization at lower energies and coarser discretization at higher energies). Further, the spatial coordinates $\vec{r}$, $\vec{r}$', and $\vec{r}$'' can use a compressed grid in which certain regions (e.g., regions having a uniform distribution of scatter cross-section/radiodensity or for which scatter/attenuation is small) can be coarsely discretized (i.e., lave a large pixel pitch), whereas other regions to which the scatter simulation is more sensitive (e.g., edges/boundaries between organs/bones and high scatter/attenuation regions) are more finely discretized (i.e., lave a small pixel pitch).

In certain implementations, the RTE calculation is accelerated by expanding the X-ray fields ψ and the cross-sections f using spherical harmonics (i.e., $Y_{lm}(\hat{\Omega})$). Then the propagation of the spherical harmonic components of the scattered field can be simplified using spherical coordinates. When the model of the scattering object (e.g., a patient undergoing a CT scan) is expressed in Cartesian coordinates (e.g., Cartesian coordinates are used for the tomographic reconstruction of the patient), then the conversion between Cartesian and spherical coordinates can be performed using known interpolation methods.

In addition to first-order scatter $\psi_1(\vec{r},E,\hat{\Omega})$, the total scatter $\psi_s(\vec{r},E,\hat{\Omega})$ can include higher-order scatter. For example, the total scatter can be calculated as $$\psi_s(\vec{r}, E, \hat{\Omega}) =$$
$$\psi_1(\vec{r}, E, \hat{\Omega}) + \int_{\vec{r}_c}^{\vec{r}} d\vec{r}' \int\int d\hat{\Omega}' dE' f(\vec{r}', E, E', \hat{\Omega}\cdot\hat{\Omega}')\psi_s(\vec{r}', E', \hat{\Omega}')$$
$$\exp\left[-\int_{\vec{r}'}^{\vec{r}} d\vec{r}'' \mu(\vec{r}'', E)\right],$$

wherein the first term on the right-hand side is the first-order scatter and the second term on the right-hand side (i.e., the integral) represents higher-order scatter. In this case, the spatial resolution of the first-order scatter can be different (e.g., finer) than that of the higher-order scatter, and the two results with different resolutions can be combined onto a common grid resolution using known interpolation methods. For example, simulations and/or empirical data can be used to determine an optimal spatial resolution for each order of scatter.

In certain implementations, higher-order scatter can be smoothed with fewer high spatial-frequency components, and, therefore, a coarser spatial resolution can be used with higher-order scatter.

The scattered X-ray field at the detectors, which are located at position $\vec{r}_D$, can be expressed as $$\psi_s(\vec{r}_D, E, \hat{\Omega}) =$$
$$\int_{\vec{r}_c}^{\vec{r}_D} d\vec{r}' \int\int d\hat{\Omega}' dE' f(\vec{r}', E, E', \hat{\Omega}\cdot\hat{\Omega}')[\psi_s(\vec{r}', E', \hat{\Omega}) + \psi_0(\vec{r}', E', \hat{\Omega}')]$$
$$\exp\left[-\int_{\vec{r}'}^{\vec{r}_D} d\vec{r}'' \mu(\vec{r}'', E)\right].$$

Improved performance can be achieved by using a different angular resolution and a different angular span for the solid angle $\hat{\Omega}$ at the detectors than is used for the above scatter simulations for scatter between points in the scatter object (e.g., the patient). For example, for scatter between points in the scatter object, 4π steradians coverage can be advantageous (i.e., the direction of the scattered X-ray is not necessarily limited). However, the detectors might only detect X-rays entering from their front face, and the angle of acceptance might be further limited by an anti-scatter grid (ASG). Thus, scatter simulation at the detector positions $\vec{r}_D$ might be performed faster by only calculating the scatter within a restricted angular acceptance window of the detectors in combination with the ASG. Further, in certain implementations, a finer angular resolution can be used within the restricted angular acceptance window.

An X-ray beam, in the presence of a scattering object, can be modeled as a summation of a primary X-ray beam, P(x,y), and a scattered X-ray beam, S(x,y), wherein the projection data, T(x,y), is the composite of the two:

$$T(x,y)=P(x,y)+S(x,y).$$

For computed tomography (CT), improved image quality can be achieved by performing image reconstruction using the primary beam P(x,y), which can be estimated, e.g., by using the projection data T(x,y) to estimate the scatter beam S(x,y), and then removing the estimated scatter beam S(x,y) from the projection data T(x,y) to obtain the primary beam P (x,y). The primary beam P(x,y), rather than the total projection data T(x,y) is then used for tomographic reconstruction, thereby avoiding the imaging artifacts arising from the scatter S (x,y).

In solving for and correcting for the scatter S(x,y), two approaches can be used. First, the kernel-based methods use a convolution between a kernel and an image to simulate scatter. Second, model-based methods rely on a spatial model of a scattering object to compute the scatter as a function of position within the scattering object. The measured projection data can be corrected by subtracting the simulated scatter, leaving the primary beam for computed tomography (CT) reconstruction of an image.

Inefficient scatter simulation and compensation can significantly affect imaging quality and result in poor image contrast, artifact generation, and large errors in CT projection data. In the context of cone-beam CT with a-wide beam geometry, scatter correction can become even more important for reconstructing high quality images.

While convolution-based approaches, including the kernel-based approach described above, can be accurate in correcting scatter, the presence of significant errors on the order of 20 to 40 Hounsfield Units (Hu), including those introduced by objects having complex shapes and/or multiple materials, can impact performance and degrade accuracy of the subsequently reconstructed image, thus inhibiting advancement and broader implementation of the approach.

Where convolution-based approaches fall short, model-based approaches for scatter simulation show promise.

Scatter correction with precise simulation of the scatter physical processing using, for example, Monte Carlo methods, can reduce errors in corrected CT projection data to mitigate artifacts in images reconstructed from the CT projection data. Monte Carlo methods are, however, challenging to apply to practical scatter correction because they require significant computational resources and time, thus presenting an inherent balance between accuracy and speed. Further, although Monte Carlo methods can be accelerated by reducing simulated photon number and fitting the simulated data, noise from the discrete, as opposed to continuous, nature of Monte Carlo simulations can negatively impact the scatter correction.

Model-based scatter simulations using a deterministic radiative transfer equation (RTE), alternatively, have the potential to provide a noise-free solution with fast simulation speed for scatter compensation. While capable of being performed in a few seconds using GPU acceleration, discrete ordinate implementations using the RTE can cause a ray effect that, like the noise of Monte Carlo methods, negatively impacts the precision of the simulation. Furthermore, in current many-core processors, a memory bandwidth bottleneck can limit the acceleration of the simulation achievable via parallelization. For example, the acceleration can be limited when RTE is simulated using a finite-element discrete ordinate method with an explicit matrix with a very large dimension.

Therefore, as described in the present disclosure, an integral spherical harmonics implementation for RTE scatter simulation can provide a solution to the above described speed limitations. While offering a rapid and precise ray-effect-free scatter solution, the feasibility of scatter simulations for routine clinical applications remains minimal.

The above-described integral spherical harmonics implementation for RTE scatter simulation can be further accelerated according to one or more acceleration strategies described in the present disclosure. Moreover, the one or more acceleration strategies can be applied within the integral spherical harmonics RTE framework to expand the clinical feasibility of the approach.

Accordingly, without sacrificing precision or increasing noise, as is the case for other methods, the methods described herein provide fast simulations for scatter correction. The methods of the present disclosure relate to acceleration methods implemented with three domains of discretization of the RTE, including the spatial domain, the angular domain, and the energy domain. One or more acceleration methods can be directed to non-uniform discretization methods wherein a dynamic resolution can be implemented within the system. One or more of the acceleration methods can be directed to spatial discretization and the implementation of a dual-coordinate system for estimating scatter within a specific voxel.

Referring now to the figures, FIG. 1 shows a diagram of the scatter process in which a primary flux 105 is transmitted with attenuation through an object and detected at a plurality of detectors 104. As shown in FIG. 1, the object can be a phantom 103, or in clinical applications, the object can be a patient. Per conventional CT, a CT system 100 may include an X-ray source 101, a bowtie 102, and the plurality of detectors 104 outfitted with an anti-scatter grid 106. The primary flux 105 includes X-rays that are not scattered. In addition to the primary flux 105, the detector also detects first-scatter flux 110, which includes X-rays that have undergone a single scattering event. Further, the plurality of detectors 104 also detect multi-scatter flux, or multiple-scatter flux 115, which includes X-rays that have been scattered multiple times.

Figure 2:
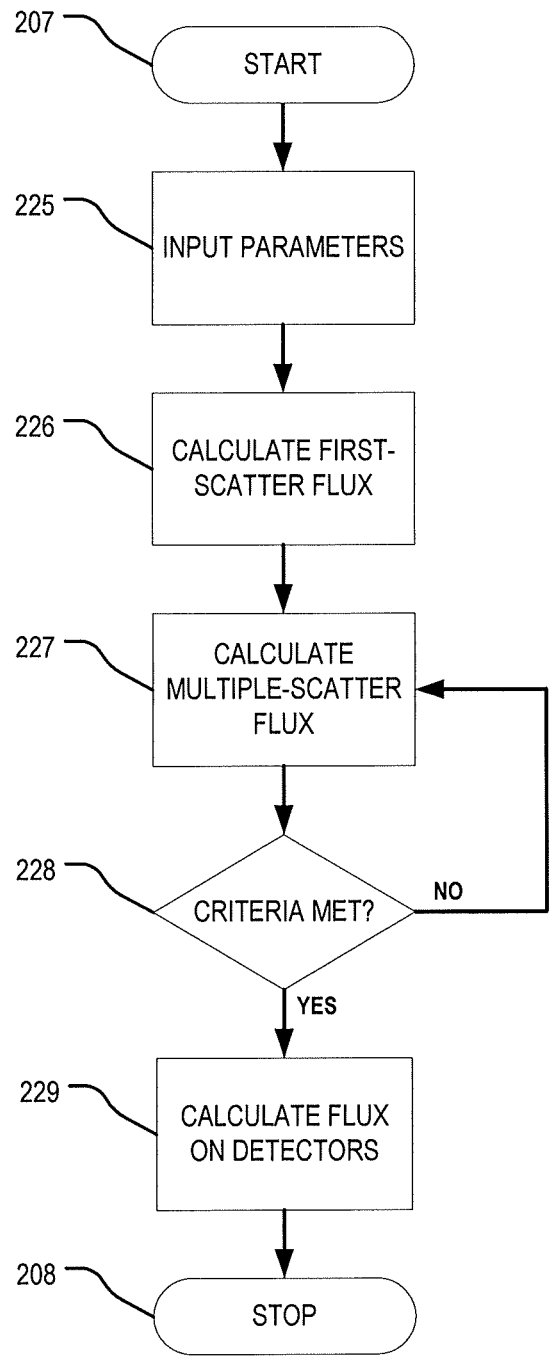
FIG. 2 is a flowchart of a method for performing a scatter simulation using a radiative transfer equation, according to an exemplary embodiment of the present disclosure.

Scatter can be accurately simulated by including both the first-scatter flux and the multiple-scatter flux, shown in FIG. 1, in order to represent an accurate physical model. With reference to FIG. 2, this physical model of X-ray flux can be expressed using an RTE, which is given by $$\hat{\Omega}\cdot\nabla\psi(\vec{r},E,\hat{\Omega}) + \mu(\vec{r},E,\hat{\Omega})\psi(\vec{r},E,\hat{\Omega}) = \iint d\hat{\Omega}'dE'f(\vec{r},E,E',\hat{\Omega}\cdot\hat{\Omega}')\psi(\vec{r},E',\hat{\Omega}'),$$

subject to the boundary condition $$\psi(\vec{r}_c,E,\hat{\Omega}) = \psi_c(\vec{r}_c,E,\hat{\Omega}), \text{ for } \hat{n}\cdot\hat{\Omega}<0,$$

wherein $\psi(\vec{r}, E, \hat{\Omega})$ is the specific intensity of photon flux at point $\vec{r}$, E is an energy, and $\hat{\Omega}$ is a unit vector in the direction of propagation for the photon flux. In the boundary condition, the intensity $\psi_c(\vec{r}_c,E,\hat{\Omega})$ depends on the X-ray source and, if a bowtie filter is used to collimator the X-ray source, on the bowtie scattering. Further, the vector $\vec{r}_c$ indicates a point on the surface of the object, $\hat{n}$ is the normal vector to the boundary surface, and $f(\vec{r}',E,E',\hat{\Omega}\cdot\hat{\Omega}')$ is the scatter cross section, which includes both Compton and Rayleigh scattering for X-ray CT. Finally, the variable $\mu(\vec{r},E)$ represents the total attenuation coefficient for the X-rays at point $\vec{r}$ and energy E.

A method described herein solves the above RTE to obtain a precise scatter solution for CT scatter compensation. This is achieved by first expressing the RTE as an integral equation, which is given by $$\psi(\vec{r}, E, \hat{\Omega}) = \psi_C(\vec{r}_C, E, \hat{\Omega}) \exp\left[\int_{\vec{r}_C}^{\vec{r}} d\vec{r}'' \mu(\vec{r}'', E)\right] +$$

$$\int_{\vec{r}_c}^{\vec{r}} d\vec{r}' \iint d\hat{\Omega}' dE' f(\vec{r}', E, E', \hat{\Omega}\cdot\hat{\Omega}')$$

$$\psi(\vec{r}', E', \hat{\Omega}') \exp\left[\int_{\vec{r}'}^{\vec{r}} d\vec{r}'' \mu(\vec{r}'', E')\right]$$

As indicated in FIG. 1, the flux can be grouped into three components: (1) the primary flux, (2) the first-scatter flux, and (3) the multi-scatter flux. Method 200, of FIG. 2, is organized to solve the integral equation representation of the RTE in steps corresponding to the above-identified three respective components of the flux.

The portion of the RTE corresponding to the (1) primary flux can be calculated separately from the portion corresponding to ((2) and (3)) scatter. Further, the portion of the RTE corresponding to scatter lends itself to the application of spherical harmonics, whereas the portion of the RTE corresponding to the primary flux (without scatter) is difficult to expand in terms of spherical harmonics as the primary flux tends to be anisotropic. For example, depending on the geometry of the X-ray beam, the X-ray beam can locally resemble a plane wave. Fortunately, it is not necessary to simultaneously calculate the primary flux with the scatter flux when performing scatter simulation. Accordingly, the RTE can be separated into at least two components (i.e., scatter and primary), and the scatter flux of the RTE can be calculated by $$\psi_s(\vec{r}, E, \hat{\Omega}) =$$

$$\int_{\vec{r}_c}^{\vec{r}} d\vec{r}' \iint d\hat{\Omega}' dE' f(\vec{r}', E, E', \hat{\Omega}\cdot\hat{\Omega}') [\psi_s(\vec{r}', E', \hat{\Omega}') + \psi_0(\vec{r}, E', \hat{\Omega}')]$$

$$\exp\left[-\int_{\vec{r}}^{\vec{r}} d\vec{r}'' \mu(\vec{r}'', E')\right],$$

wherein the primary flux can be calculated as $$\psi_0(\vec{r}, E, \hat{\Omega}) = \psi_c(\vec{r}_c', E', \hat{\Omega}') \exp\left[-\int_{\vec{r}_c}^{\vec{r}} d\vec{r}'' \mu(\vec{r}'', E')\right],$$

wherein $\psi_0(\vec{r}',E,\hat{\Omega})$ is the primary flux and $\psi_s(\vec{r},E,\hat{\Omega})$ is the intensity of the scatter flux. Although the expression for the scatter flux is not a closed-form expression, the scatter flux can be calculated iteratively until convergence, as described below.

With reference to FIG. 2, in step 225 of method 200, the raw CT projection data can be obtained. Further, various other parameters are obtained, including: the X-ray source spectrum, the CT geometry, voxel-based phantom/tissue geometry information, and the scatter cross section and the total attenuation of different materials. For example, the voxel-based phantom/tissue geometry information could be derived from a reconstructed CT image using the uncorrected projection data. Various other input parameters, such as the scatter cross section and total attenuation of different materials, can be derived or extrapolated from a combination of the reconstructed image and prior knowledge about the imaged object (e.g., the imaged object can be a phantom or part of a patient). Additionally, certain of the parameters, such as the X-ray source spectrum and the CT geometry, can be measured beforehand during calibrations or obtained from known specifications of the CT apparatus.

In step 226 of method 200, the first-scatter flux can be calculated. Similar to the primary-flux calculation, the first-scatter flux is also obtained directly from X-ray CT system, and, therefore, calculating the first-scatter flux using a spherical-harmonic expansion is also difficult. Nevertheless, the first-scatter flux can be calculated by a discretized integral formula, which is given by $$\psi_1(\vec{r}, E, l, m) = \qquad (1)$$
$$\int\int\int d^3\vec{r}' \exp\left[-\int_{\vec{r}'}^{\vec{r}} d\vec{r}'' \mu(\vec{r}'', E')\right] \frac{1}{|\vec{r}-\vec{r}'|^2} Y_{lm}^*(\hat{\Omega}) \times \int dE'$$
$$f(\vec{r}, E, E', \hat{\Omega}\cdot\hat{\Omega}')\psi_c(\vec{r}_c, E', \hat{\Omega}') \exp\left[-\int_{\vec{r}_c}^{\vec{r}'} d\vec{r}'' \mu(\vec{r}'', E')\right],$$

wherein $Y_{lm}^*(\hat{\Omega})$ is the complex conjugation of a spherical harmonic function of degree l and order m, and $\psi_1(\vec{r},E,l,m)$ is the intensity of the first-scatter flux in the spherical-harmonics domain. The spherical harmonics can be given by $$Y_{lm}(\hat{\Omega})=Y_{lm}(\theta,\phi)=N\exp(im\phi)P_l^m(\cos(\theta)),$$

wherein $Y_{lm}(\hat{\Omega})$ is a spherical harmonic function of degree l and order m, $P_l^m$ is an associated Legendre polynomial, N is a normalization constant, and θ and φ represent colatitude and longitude, respectively. The number of spherical harmonics used to approximate the first-scatter flux can depend on the material component and scatter cross-section at the point $\vec{r}'$ and on the type of scattering (e.g., Compton and Raleigh scattering).

In applying the above, different materials, such as bone and water, have different scattering cross-sections with different angular dependence, depending on their atomic constituents. Also, the magnitude of the scatter cross-section can depend on the density of material components at the point $\vec{r}'$. Thus, the physical model, such as the physical model shown in FIG. 1, can be decomposed into material components using a material decomposition to determine the density of various material components as a function of position, and the position-dependent scatter cross-section can be obtained from the spatial density map of the material components. The position dependent cross-section can be obtained as a linear super position of the coefficients of the material components and previously normalized scatter cross-sections for the material components. The material decomposition can be performed using dual-energy CT, or using a threshold and region-growing method that infers regions corresponding to material components by the attenuation of the voxels (e.g., voxels having an attenuation value above a predefined threshold in Hounsfield Units are determined to be bone).

X-ray scattering is dominated by Compton scattering, which tends to be more isotropic than other scattering mechanisms such as Raleigh scattering. Accordingly, for common materials such as bone and water, an accurate approximation to the Compton scattering of X-rays can be achieved with relatively few spherical harmonics. The number of spherical harmonics applied in method 200 can be predetermined empirically, or determined during the execution of method 200 using a convergence criterion for the accuracy of the approximation.

With reference again to FIG. 2, in step 227 of method 200, the higher-order scatter terms, or multi-scatter terms, can be calculated. Whereas the first-scatter flux includes only X-ray photons that have been scattered one time, the $k^{th}$-order scatter term includes X-ray photons that have been scattered k times. After the first-scatter flux is calculated, the flux of multiple scatters can be calculated using a discretized integral spherical harmonics formula, which is given by $$\psi_s^{k+1}(\vec{r}, E, l, m) = \qquad (2)$$
$$\psi_1(\vec{r}, E, l, m) + \int\int\int d^3\psi_s^{k+1}\vec{r}' \exp\left[-\int_{\vec{r}'}^{\vec{r}} d\vec{r}'' \mu(\vec{r}'', E')\right] \frac{1}{|\vec{r}-\vec{r}'|^2}$$
$$Y_{lm}^*(\hat{\Omega}) \times \sum_{E'}\sum_{\bar{l}} f(\vec{r}, E, E', \bar{l})\sum_{\bar{m}} Y_{\bar{lm}}(\hat{\Omega})\psi_s^k(\vec{r}'E', \bar{l}, \bar{m}),$$

wherein $\psi_s^{k+1}(\vec{r},E,l,m)$ and $\psi_s^k(\vec{r}',E',\bar{l},\bar{m})$ are the intensity of the flux for multiple scatter including all scatter events up to order k+1 and order k respectively and $f(\vec{r}',E,E',\bar{l})$ is the $\bar{l}$-th coefficient when the scatter cross-section is expanded using the Legendre polynomials. By defining $$A = \int\int\int d^3\vec{r}' \exp\left[-\int_{\vec{r}'}^{\vec{r}} d\vec{r}'' \mu(\vec{r}'', E')\right]$$
$$\frac{1}{|\vec{r}-\vec{r}'|^2} Y_{lm}^*(\hat{\Omega}) \times \sum_{E'}\sum_{\bar{l}} f(\vec{r}, E, E', \bar{l})\sum_{\bar{m}} Y_{\bar{lm}}(\hat{\Omega}),$$

the above-defined iterative formula can be more simply expressed as $$\psi_s^{k+1} = A\psi_s^k + \psi_1.$$

In step 228 of method 200, stopping criteria are assessed to determine whether approximation up to order k is sufficiently accurate. i.e., whether scattering accounted for by the above-defined iterative multi-scatter calculation when calculated up to order k provides an adequately accurate representation of the scatter. For example, the stopping criteria can be satisfied when $$|\psi_s^{k+1} - \psi_s^k|/\psi_s^k \leq \varepsilon,$$

wherein ε is a predefined threshold. Further, the stopping criteria can be satisfied when a maximum value for k (i.e., a maximum number of iterations) has been reached. If the stopping criteria are satisfied, then method 200 proceeds from step 228 to step 229. Otherwise, step 227 is repeated for the next higher order of multiple scattering.

In step 229 of method 200, the flux at the detector can be determined. After calculating the flux of multiple scatters, the scatter flux intensity $\Phi_s(\vec{r}_D,E)$ on the detectors can be calculated by $$\Phi_s(\vec{r}_D, E) = \tag{3}$$

$$\iiint d^3r' \frac{R_{ASG}(E,\hat{\Omega})}{|\vec{r}_D - \vec{r}'|^2} \int dE' \sum_{l',m'} f(\vec{r}', E, E', l') Y_{l'm'}(\hat{\Omega})$$

$$\psi_s(\vec{r}', E', l', m') \times \exp\left[-\int_{\vec{r}'}^{\vec{r}_c} d\vec{r}'' \mu(\vec{r}'', E)\right] +$$

$$\iiint d^3r' R_{ASG}(E,\hat{\Omega}) \frac{1}{|\vec{r}_D - \vec{r}'|^2} \int dE' f(\vec{r}', E, E', \hat{\Omega}\cdot\hat{\Omega}') \times \psi_c(\vec{r}_c,$$

$$E', \hat{\Omega}') \exp\left[-\int_{\vec{r}_0}^{\vec{r}} d\vec{r}'' \mu(\vec{r}'', E)\right] \exp\left[-\int_{\vec{r}'}^{\vec{r}_c} d\vec{r}'' \mu(\vec{r}'', E)\right]$$

wherein $R_{ASG}(E,\hat{\Omega})$ is the factor accounting for the effects of the ASG.

In certain implementations, the incident flux on the detectors is affected by ASGs, such that the X-rays actually detected at the detectors differ from the incident flux. Accordingly, in step 229, the effect of the ASG on the first-scatter flux and the multiple-scatter flux can be determined. The ASGs are arranged, as much as possible, to limit and prevent scatter from reaching the detectors. Accordingly, the effect of properly arranged ASGs on the incident scatter flux can be significant.

Now, several approaches/techniques are discussed for accelerating a model-based RTE scatter simulation. For example, the present disclosure describes methods for accelerating the solving of the above-described equations.

According to an embodiment of the present disclosure, a general implementation of the integral spherical harmonics-based RTE comprises, as shown in FIG. 2, an initialization step 207 includes an inputting of parameters at step 225. Next, at step 226, a calculation of a first-scatter flux in the object can be performed. From the first-scatter flux, a multiple-scatter flux in the object can be obtained iteratively at step 227, wherein successive instances of scatter are determined until convergence or other stopping criteria are met at step 228. If the stopping criteria are not met, successive instances of scatter continue to be determined until the stopping criteria are met. When the stopping criteria are met, a total scatter flux at the detector (Eq. (3)) can be calculated from the first-scatter from in the object (Eq. (1)) and the multiple-scatter flux in the object (Eq. (2)). In each of the above steps, the integral equations, i.e., Eq. (1), Eq. (2), and Eq. (3), can be solved/approximated numerically using respective discretizations in space, solid angle, and energy. The acceleration approaches/techniques discussed below relate to selecting an optimal grid discretization for space, solid angle, or energy to enable faster scatter simulations without significantly degrading accuracy. For example, faster scatter simulations can be achieved using non-uniform grids having higher resolution in regions that significantly affect the accuracy and lower resolution in regions that do not significantly affect the accuracy.

Figure 3A:
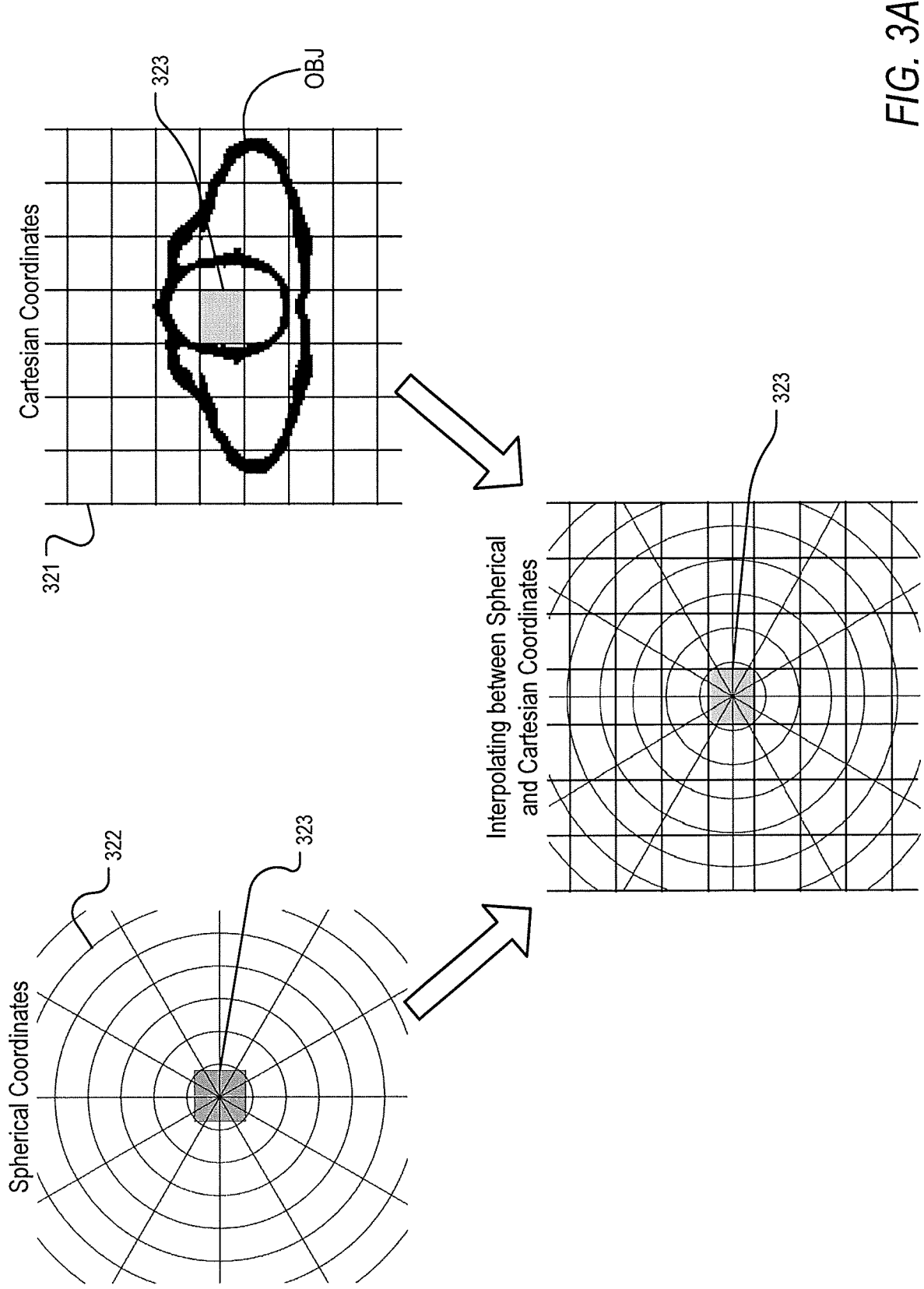
FIG. 3A is a schematic of a dual-coordinate system for scatter simulation, according to an exemplary embodiment of the present disclosure.
Figure 3B:
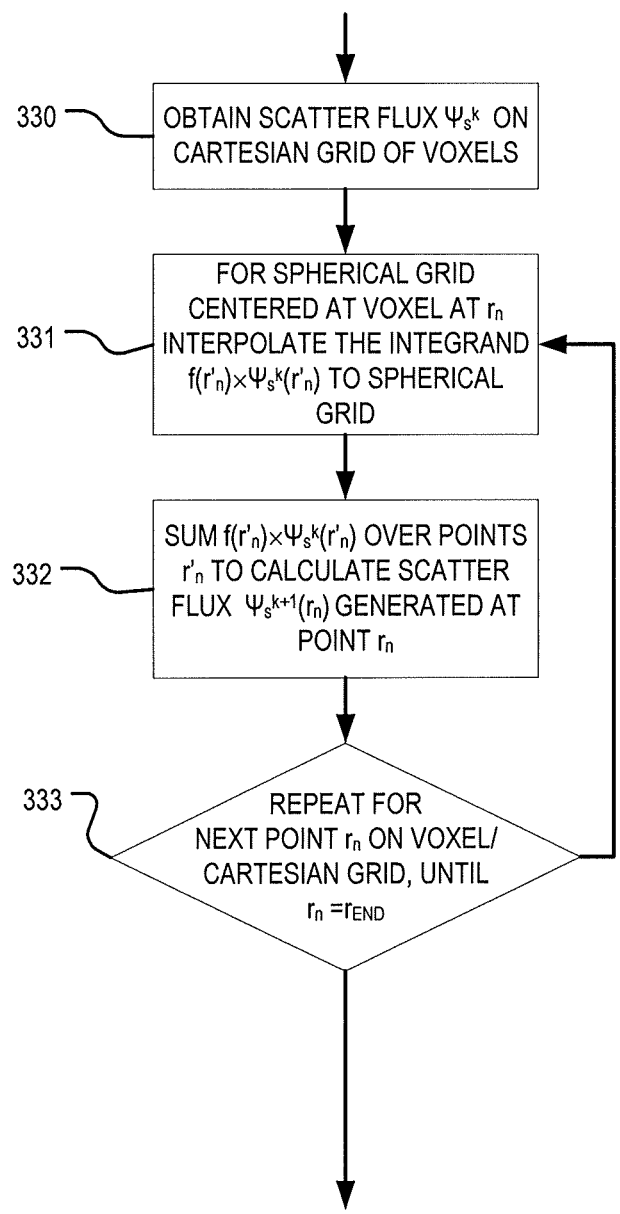
FIG. 3B is a flowchart of a method employing a dual-coordinate system for scatter simulation, according to an exemplary embodiment of the present disclosure.

FIGS. 3A and 3B illustrate a non-limiting example of improving performance of the scatter simulation by using spherical coordinates to discretize the spatial domain $\vec{r}$.

In FIG. 3A, a discretized object OBJ can be discretized using a Cartesian grid 321. For example, the object OBJ can be based on a reconstructed CT image. In an example, the object can be a biological tissue including, among others, a body of a patient.

Using the Hounsfield Units for the radio density in the CT image (and optionally a material decomposition into material components) the scatter cross-section $f(\vec{r}',E,E',\hat{\Omega}\cdot\hat{\Omega}')$ can be generated as a function of position $\vec{r}'$ for each voxel in the CT image (i.e., the scatter cross-section $f(\vec{r}',E,E',\hat{\Omega}\cdot\hat{\Omega}')$ in the integrand can be expressed in Cartesian coordinates). On the other hand, the scatter fields $\psi_s^k(\vec{r}',E',\bar{l},\bar{m})$ are expanded in terms of spherical harmonics $Y_{lm}(\hat{\Omega})$, and therefore, a spherical-coordinate grid 322 is a more natural fit for representing the fields. Thus, different components in the integrands in Eq. (1), Eq. (2), and Eq. (3) can be spatial discretized using different coordinate systems, and conversions between coordinate systems can be performed using known interpolation methods (e.g., linear interpolation or cubic interpolation). In certain implementations, the interpolation can be performed in advance and stored as a lookup table.

For example, in Cartesian coordinates, the interaction between the field and a region in the object OBJ can be calculated as generating a scatter field $\psi_s^k(\vec{r}',E',\bar{l},\bar{m})$, which is expressed in spherical harmonics, and the propagation of the scatter field $\psi_s^k(\vec{r}',E',\bar{l},\bar{m})$ to a next scattering point can use spherical-coordinate grid 322. Then, at the next scattering point, the scatter field $\psi_s^k(\vec{r}',E',\bar{l},\bar{m})$ can be interpolated onto the Cartesian grid 321 to calculate the next scatter field $\psi_s^k(\vec{r}',E',\bar{l},\bar{m})$.

Thus, object can described with Cartesian grid 321 for scatter flux calculation. The scatter flux for a specific voxel 323 (indicated by grey shading) in the Cartesian grid 321 can be calculated by integrating the flux contributions, which are represented using a spherical grid 322 centered at the specific voxel 323 for which scatter is being calculated. In the spherical coordinate system each discretized region subtends and equal solid angle of the scattering voxels, resulting in each discretized region contributing equally to the field converging to the scattering voxel 323. In contrast, for the Cartesian coordinate system, the relative weighting of the contributions of each source voxel to the total field converging on the scattering voxel 323 are all different. These differences can results in errors that adversely affect the accuracy of the simulation.

To prevent these errors, in certain implementations, part of the calculations are performed using a spherical grid 322, rather than a Cartesian grid 321. For example, for a given voxel 323 in the Cartesian grid 321, the contributions to the incident fields $\psi_s^k$ converging to the given voxel 323 are calculated using a spherical grid 322. Then the amount scatter flux $\psi_s^{k+1}$ generated from the given voxel 323 is calculated in the Cartesian coordinate system. Then, in a next iteration to calculate $\psi_s^{k+2}$, the scatter flux $\psi_s^{k+1}$ is interpolated from Cartesian to spherical coordinate system to calculate the incident fields $\psi_s^{k+1}$ converging to respective voxels in the Cartesian coordinate system.

The use of dual coordinate systems (i.e., Cartesian to spherical coordinate systems) has several advantages. As discussed above, using of dual coordinate systems improves the calculation precision. Additionally, it also separates the spatial resolution of the discretized object and point sampling steps, which can also improve the speed of the simulation.

According to an embodiment of the present disclosure, the discretized object 321 can be first discretized in Cartesian coordinates. The simulated scatter flux can then be saved in Cartesian coordinates. The scatter flux of discretized points in a spherical coordinate system 322 can then be calculated via cubic linear interpolation from the discretized points in the Cartesian coordinate system. In an embodiment, the utilization of dual coordinate systems, generated therefrom, can improve accuracy of the scatter flux calculation and separate spatial resolution of the discretized object 321 from point sampling steps, an improvement that may enhance simulation speed while maintaining accuracy.

FIG. 3B shows a flowchart of one implementation of step 227' that uses interpolation between Cartesian and spherical coordinate grids for simulating scatter. For example, the integral equation for total scatter can be spatially discretized as $$\psi_s^{k+1}(r_n = r_0', E, \hat{\Omega}) = \psi_1(r_n, E, \hat{\Omega}) +$$

$$\Delta r' \Delta \varphi' \Delta \theta' \sum_{r_j' = \Delta r'}^{r_{END}'} \sum_{\varphi_m' = \Delta \varphi'}^{2\pi} \sum_{\theta_p' = \Delta \theta'}^{\pi} \int dE' f(r_j', \theta_m', \varphi_p', E, E', \hat{\Omega} \cdot \hat{\Omega}')$$

$$\psi_s^k(r_j', \theta_m', \varphi_{p'}', E', \hat{\Omega}') \exp\left[-\int_{\{r_j', \theta_m', \varphi_p'\}}^{r_n} d\vec{r}'' \mu(\vec{r}'', E)\right],$$

wherein the point $r_n$ is at the center $r'_0$ of a spherical grid, and the points $r'_j$, $\theta'_m$, and $\varphi'_p$ refer to the discretized coordinates at the remaining points on the spherical grid.

In step 330, the cross-section f and the scatter flux $\psi_s^k$ for the $k^{th}$ iteration are obtained. These quantities can be discretized on a Cartesian grid.

In step 331, the product $f \times \psi_s^k$ is obtained on a spherical grid. For example, the cross-section f and the scatter flux $\psi_s^k$ can each be interpolated onto the spherical grid and then the product is calculated. Alternatively, the product is calculated using the values on the Cartesian grid, and then the product $f \times \psi_s^k$ can each be interpolated onto the spherical grid.

In step 332, the points on the spherical grid are summed with respect to $r'_j$, $\theta'_m$, and $\varphi'_p$, to generate, at the point $r_n$ on the Cartesian grid, the scatter flux $\psi_s^{k+1}$ for the $k+1^{th}$ iteration.

In step 333, the steps 331 and 332 are repeated for a next point $r_n$ on the Cartesian grid until all of the scatter flux $\psi_s^{k+1}$ has been calculated for points on the Cartesian grid. Thus, although the scatter flux $\psi_s^k$ and $\psi_s^{k+1}$ and the cross-section f are generated and stored on the Cartesian grid. The summation of the integrand $f \times \psi_s^k$ for each voxel point $r_n$ on the Cartesian grid can be performed using a spherical grid centered at a voxel point $r_n$, allowing for more accurate and potentially faster computation.

In certain implementations, the interpolation can be performed using a lookup table in which the relative contribution of each unit of the grid in Cartesian coordinates to each unit of the grid in spherical coordinates is calculated in advance and stored. Thus, the interpolation can be performed very fast (e.g., as a sparse matrix multiplication, wherein the values on the Cartesian grid are an input vector and the values on the spherical grid are an output vector).

Figure 4A:
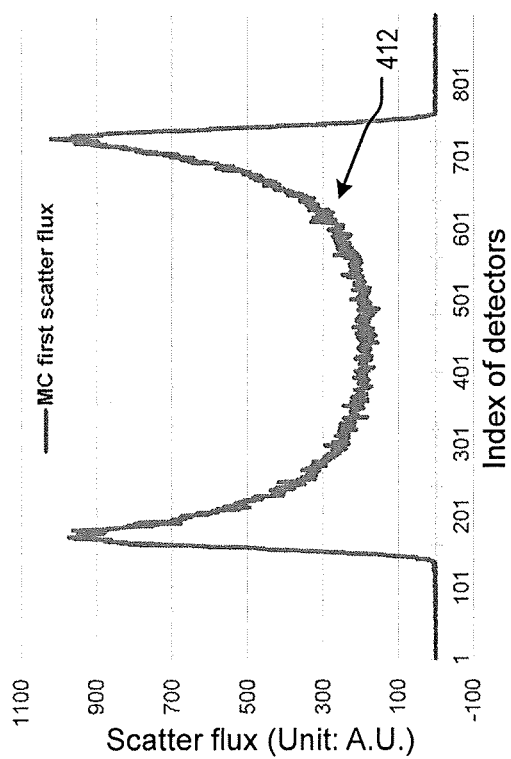
FIG. 4A is an illustration of a Monte Carlo simulation of first-scatter flux, according to an exemplary embodiment of the present disclosure.
Figure 4B:
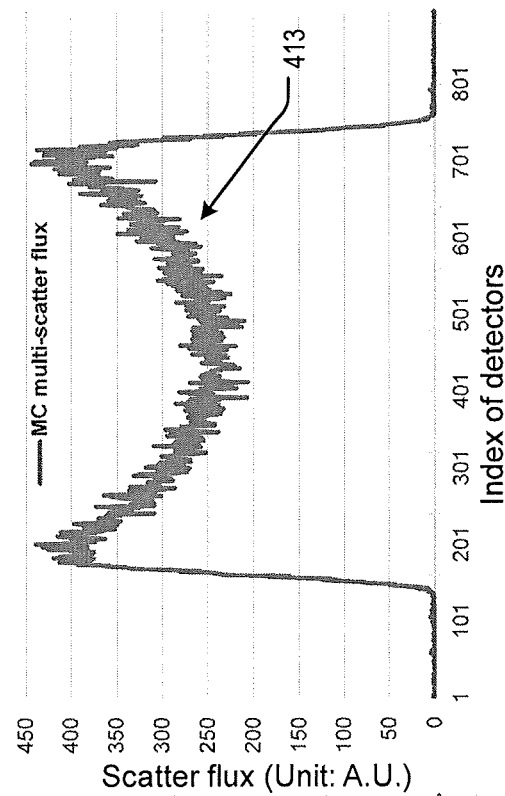
FIG. 4B is an illustration of a Monte Carlo simulation of multi-scatter flux, according to an exemplary embodiment of the present disclosure.

Next, an embodiment is discussed in which the scatter simulation is accelerated by using a coarser spatial resolution for the multiple-scatter flux $\psi_s$-$\psi_1$ than for the first-scatter flux $\psi_1$ by itself. As discussed in detail below, FIGS. 4A and 4B show, respectively, a Monte Carlo simulation result 412 for the first-scatter flux $\psi_1$ and a Monte Carlo simulation result 413 for the multiple-scatter flux $\psi_s$-$\psi_1$. By comparing these two simulation results, it can be observed that the first-scatter flux $\psi_1$ has sharper features than the multiple-scatter flux $\psi_s$-$\psi_1$. Moreover, this result is physically intuitive because scatter can be modeled as a convolution with a double Gaussian kernel, as discussed above. Thus, each higher-order of scatter can be expected to become progressively smoother than the lower-orders of scatter. Consequently, a lower spatial resolution of the discretization grid can be used for multiple-scatter flux $\psi_s$-$\psi_1$ than is used for the first-scatter flux $\psi_1$. Accordingly, in the expression $$\psi_s(\vec{r}, E, \hat{\Omega}) =$$

$$\psi_1(\vec{r}, E, \hat{\Omega}) + \int_{\vec{r}_c}^{\vec{r}} d\vec{r}' \int \int d\hat{\Omega}' dE' f(\vec{r}', E, E', \hat{\Omega} \cdot \hat{\Omega}') \varphi_s(\vec{r}', E', \hat{\Omega}')$$

$$\exp\left[-\int_{\vec{r}'}^{\vec{r}} d\vec{r}'' \mu(\vec{r}'', E)\right],$$

the first term on the right-hand side (i.e., $\psi_1(\vec{r}, E, \hat{\Omega})$) can be discretized at a first pixel pitch, whereas the second term on the right-hand side $$\left(i.e., \int_{\vec{r}_c}^{\vec{r}} d\vec{r}' \right.$$

$$\left. \int \int d\hat{\Omega}' dE' f(\vec{r}', E, E', \hat{\Omega} \cdot \hat{\Omega}') \psi_S(\vec{r}', E', \hat{\Omega}') \exp\left[-\int_{\vec{r}'}^{\vec{r}} d\vec{r}'' \mu(\vec{r}'', E)\right]\right)$$

can be discretized at a second pixel pitch having coarser spatial resolution than the first pixel pitch. Thus, fewer points are on the coordinate grid using the second pixel pitch and fewer calculations are required when calculating the second term on the right-hand side, making the scatter simulation more computationally efficient without significantly sacrificing accuracy. The sum the first and second terms on the right-hand side, the second term on the right-hand side can be up-sampled or interpolated onto the coordinate grid with the first pixel pitch.

Accordingly, multiple-scatter flux can be represented primarily by low-frequency information. In other words, multiple-scatter flux distribution can be said to be resolved using a coarser spatial resolution than for the first-scatter flux distribution. The above-described scatter flux distribution can be observed in FIG. 4A and FIG. 4B. Specifically, FIG. 4A and FIG. 4B are graphical representations of Monte Carlo simulations of scatter flux within a 32 cm water phantom in a conventional CT geometry. With reference to FIG. 4A, a graphical representation of calculated first-scatter flux 412 within the 32 cm water phantom, the distribution of scatter flux intensities across the range of detectors varies greatly.

Conversely, with reference to FIG. 4B, a graphical representation of calculated multiple-scatter flux 413 within the 32 cm water phantom, the distribution of scatter flux intensities across the range of detectors is minimal. The spatial resolution applied to the discretization of the scattering object OBJ may be independent of the spatial resolutions applied to the various orders of scatter flux.

According to an embodiment of the present disclosure, an object discretization method can use a plurality of resolutions for the spatial discretization of the scattering object OBJ and for the respective spatial discretizations of the various orders of scatter flux. In an example, the plurality of resolutions can include a first spatial resolution for the first scatter flux $\psi_1$ and a second spatial resolution, which is coarser than the first spatial resolution, for the multiple-scatter flux $\psi_s$-$\psi_1$.

Accordingly, a first object discretization grid and a second object discretization grid, having different resolutions, can be generated for scatter-flux simulation. Here, the object discretization grid can refer to scatter-cross-section model f($\vec{r}'$,E,E',$\hat{\Omega}\cdot\hat{\Omega}'$) of the object OBJ.

In an embodiment, the first object discretization grid for f($\vec{r}'$,E,E',$\hat{\Omega}\cdot\hat{\Omega}'$) can use a fine resolution for a first-scatter simulation, i.e., $$\psi_1(\vec{r}, E, \hat{\Omega}) = \int_{\vec{r}_c}^{\vec{r}} d\vec{r}'$$

$$\int\int d\hat{\Omega}' dE' f(\vec{r}', E, E', \hat{\Omega}\cdot\hat{\Omega}') \psi_0(\vec{r}', E', \hat{\Omega}') \exp\left[-\int_{\vec{r}'}^{\vec{r}} d\vec{r}'' \mu(\vec{r}'', E)\right].$$

Further, the second object discretization grid can employ a coarse resolution for f ($\vec{r}'$,E,E',$\hat{\Omega}\cdot\hat{\Omega}'$) in a multiple-scatter simulation, i.e., the integral on the right hand side of $$\psi_s(\vec{r}, E, \hat{\Omega}) - \psi_1(\vec{r}, E, \hat{\Omega}) = \int_{\vec{r}_c}^{\vec{r}} d\vec{r}'$$

$$\int\int d\hat{\Omega}' dE' f(\vec{r}', E, E', \hat{\Omega}\cdot\hat{\Omega}') \psi_s(\vec{r}', E, \hat{\Omega}) \exp\left[-\int_{\vec{r}'}^{\vec{r}} d\vec{r}'' \mu(\vec{r}'', E)\right].$$

Thus, a first discretization resolution may be used with respect to $\vec{r}$ of $\psi_1(\vec{r},E,\hat{\Omega})$ and a second discretization resolution may be used with respect to $\vec{r}$ of the integral equation on the right hand side of $\psi_s(\vec{r},E,\hat{\Omega})-\psi_1(\vec{r},E,\hat{\Omega})$. The dual-resolution object discretization method described above, therefore, can improve the speed of scatter-flux simulation while maintaining sufficient accuracy. According to an embodiment, the spatial resolution parameter of the plurality of object discretization methods can be determined empirical based on one or more simulations performed in advance. For example, a variety of phantoms of varying composition (e.g., phantoms that are representative of various patient sizes and various anatomical regions) can be evaluated in advance to determine preferred/predefined spatial resolutions to simulate the first-scatter flux and multiple-scatter flux, respectively. For example, in certain implementations, the selection of the predefined spatial resolutions for the scatter simulations can be a function of the patient size and anatomical region.

Figure 4C:
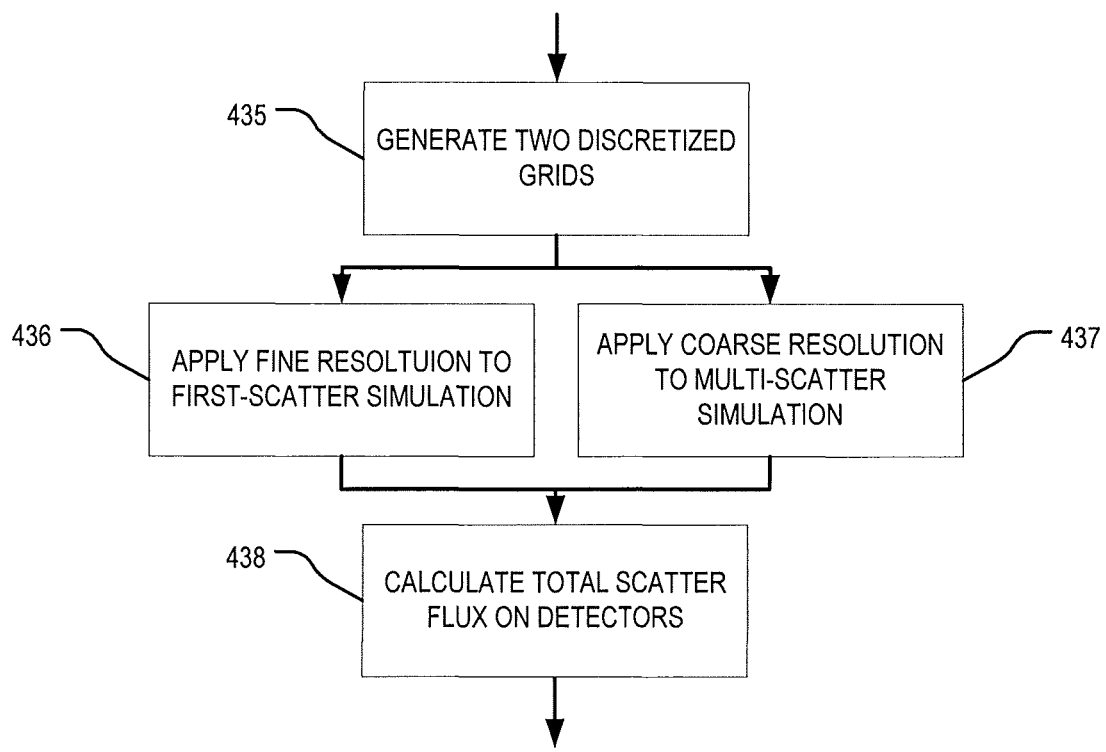
FIG. 4C is a flowchart of an implementation of a dual-resolution method for first-scatter and multiple-scatter simulation, according to an exemplary embodiment of the present disclosure.

FIG. 4C is a flowchart of one non-limiting example of the dual-resolution object discretization method. At step 435, input parameters, such as patient size and/or anatomical region can be used to select predefined resolutions for two spatial grid resolutions (i.e., pixel pitches). Alternatively, in certain implementations, the predefined resolutions for the two spatial grid resolutions can be independent of any inputs. For example, the predefined resolutions can be determined in advance based on empirical data and/or experience and stored in a memory. At step 435, the predefined resolutions are used to generate two discretized grids. A first grid has a fine resolution, and is applied to a first-scatter $\psi_1(\vec{r},E,\hat{\Omega})$ simulation at step 436 to solve Eq. (1), which can be performed similarly to step 226. A second discretization grid having a coarse resolution can be applied to a multiple-scatter $\psi_s(\vec{r},E,\hat{\Omega})-\psi_1(\vec{r},E,\hat{\Omega})$ simulation at step 437 to solve the integral term in Eq. (2), which can be performed iteratively until convergence similarly to steps 227 and 228. Having simulated first-scatter flux and multiple-scatter flux via dual-resolution object discretization grids, the total-scatter flux $\psi_s(\vec{r},E,\hat{\Omega})$ is calculated, at step 438, by interpolating the two scatter fluxes onto a common grid resolution (e.g., the fine resolution) and summing the simulated first- and multiple-scatter fluxes to generate the total-scatter flux $\psi_s(\vec{r}_D,E,\hat{\Omega})$, received at the detectors (i.e., at $\vec{r}_D$).

Figure 5B:
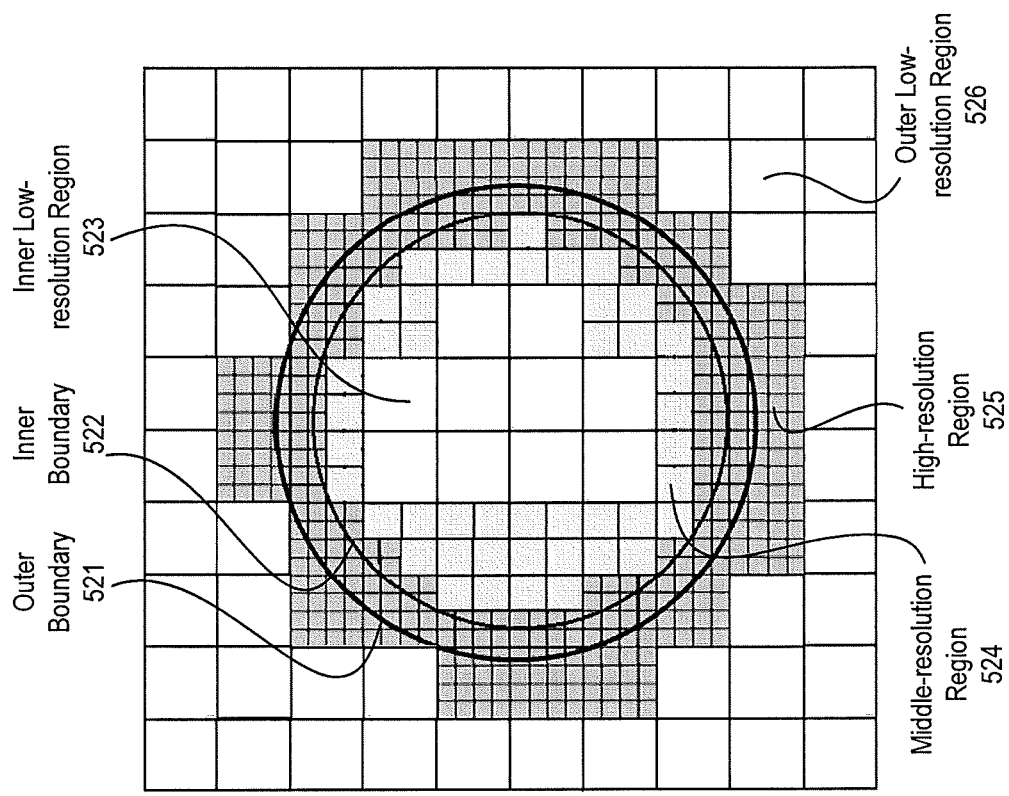
FIG. 5B is a schematic of an a priori compressed grid for scatter simulation, according to an exemplary embodiment of the present disclosure.
Figure 5A:
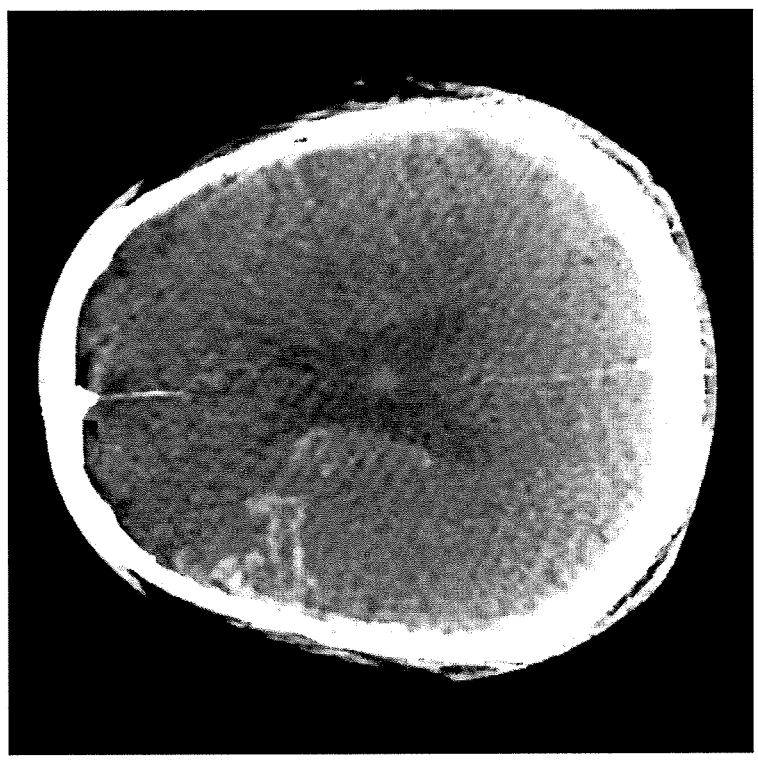
FIG. 5A is a CT image of a cross-section of a head, according to an exemplary embodiment of the present disclosure.

Further, the simulation can be further accelerated by using a non-uniform pixel pitch/resolution for the spatial grid. For example, air regions would contribute essentially no scatter and therefore can be discretized at a very coarse resolution for both first-scatter flux and multiple-scatter flux simulations. Further, regions with uniform material components and/or uniform radiodensity, especially low radiodensity, can be discretized at lower resolution than regions exhibiting high radiodensity and/or high spatial variability in radiodensity or material components. For example, FIG. 5A shows a slice of a CT image of a head. FIG. 5B shows a schematic representation how the image in FIG. 5A might be discretized, with the outer boundary 521 representing an outer periphery of the cranium and the inner boundary 522 representing an inner periphery of the cranium. In this case, a medium image resolution can be desired, e.g., near the subarachnoid space between cranium and cortex. The abrupt changes in the attenuation can be used to determine a region in which high resolution is desirable, and this change in the attenuation can be detected using one of several methods, including, e.g., edge detection, segmentation, and wavelet, Laplacian, Gaussian, or other multiscale decomposition.

FIG. 5B shows a non-limiting example of partitioning an image into four regions: an outer low-resolution region 526, a middle-resolution region 524, a high-resolution region 525, and an inner low-resolution region 523. In this example, an outer boundary 521 and an inner boundary 522 are used to define the high-resolution region. For example, the outer boundary 521 and the inner boundary 522 can be respective boundaries of a bone region, such as a cranium, which has sharp features. The high-resolution region 525 region has a resolution equal to the native resolution of the detectors. The low-resolution regions 526 and 523 correspond to parts of the image that are relatively uniform, such as brain tissue. In FIG. 5B, the pixel pitch in the low-resolution regions 526 and 523 is four times that in the high-resolution region 525. The middle-resolution region 524 can include features having a spatial structure with characteristics intermediate between those in the high- and low-resolution regions. In FIG. 5B, the middle-resolution region 524 also functions as a buffer between the high- and low-resolution regions, and has a pixel pitch that is twice that of the high-resolution region 525.

Various methods can be used to determine/learn the best resolution to assign based on, e.g., the Hounsfield units (HU)

of pixels in a reconstructed CT image, material components in the CT image, and various image processing (e.g., edge detection) performed in the CT image.

For example, an adaptive mesh method using an a posteriori error estimator can be used to iteratively solve for an optimal non-uniform grid for the projection data from a given CT scan.

When training an artificial/convolutional neural network (or another machine learning method), the CT image of the given CT scan can be used as a input training data and the optimal non-uniform grid can be used as target training data to train the neural network to generate a non-uniform grid when a CT image is applied to the neural network as an input. With a sufficient large set of training data, the neural network can learn how to generate a non-uniform grid (referred to herein as a priori compressed grid) directly from an initial CT image without the computational complexity and intensive calculations involved with adaptive mesh methods that use an a posteriori error estimator.

Although the above non-limiting example uses machine learning to determining a mapping from an initial CT image to an a priori compressed grid for the scatter model (i.e., the scatter cross-section $f(\vec{r}',E,E',\hat{\Omega}\cdot\hat{\Omega}'))$, other non-machine learning methods can be used to determine the mapping from an initial CT image to an a priori compressed grid, without departing from the spirit of the methods described herein.

In view of the above, an embodiment is now described for generating and using an a priori compressed grid to perform scatter simulations. This embodiment provides an acceleration method in the spatial domain that can be applied to first-scatter flux, multiple-scatter flux, and total scatter flux or, in other words, discretization can be performed with respect to $\vec{r}$ of each of the above-described Eq. (1), Eq. (2), and Eq. (3). Generally, with reference to FIG. 5C and FIG. 5D, an object can be discretized via implementation of compressed grids.

In certain implementations, this entails increasing resolution in areas of a spatial discretization grid where X-ray scattering is greatest and decreasing resolution in areas of the X-ray scattering is least. Further, in certain implementations, this entails increasing resolution in areas where the X-ray scatter has the greatest effect on the projection data and decreasing resolution in areas where the X-ray scatter least effects the projection data.

Figure 5D:
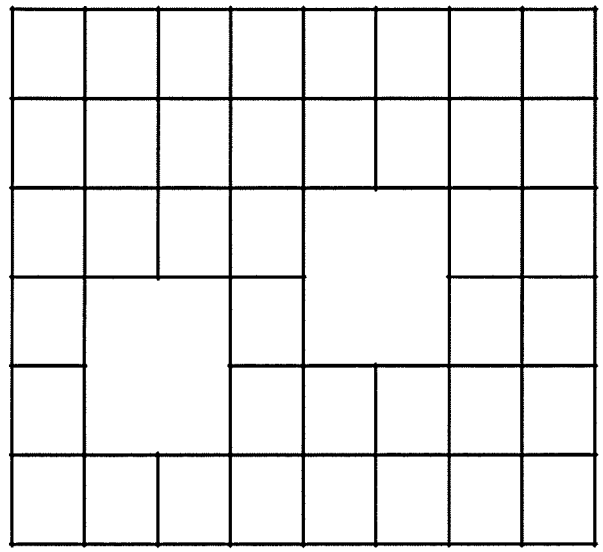
FIG. 5D is a schematic of a non-uniform grid, according to an exemplary embodiment of the present disclosure.
Figure 5C:
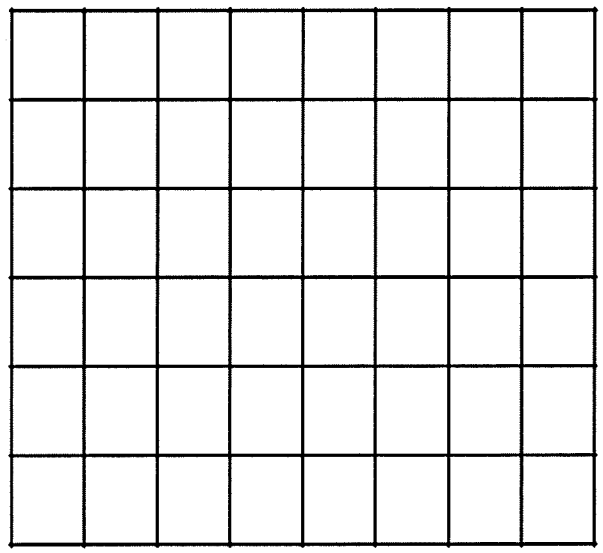
FIG. 5C is a schematic of a uniform grid, according to an exemplary embodiment of the present disclosure.

This approach can be better understood in view of the insight that, for a uniform mono-material object/phantom, the spatial resolution for uniform grid, as shown in FIG. 5C, can be optimized to achieve a desired simulation precision, and that the optimal spatial resolution for the uniform grid can be different for different mono-material/radiodensity phantoms. Accordingly, to achieve the desired simulation precision for a phantom with different materials/radiodensities at different positions, a non-uniform grid, as shown in FIG. 5D, would be optimal.

Although an adaptive mesh method, which uses an a posteriori error estimator, can use feedback (e.g., the a posteriori error) to determine the optimal non-uniform grid, this approach is slow. In general, the scatter cross-section $f(\vec{r}',E,E',\hat{\Omega}\cdot\hat{\Omega}')$ is not uniform in space, and, therefore, a uniform-grid approach can significantly increase simulation time. Adaptive mesh refinement methods, which include refining and coarsening the grid in a search to minimize the a posteriori error, can provide a solution that reduces simulation time while maintaining precision. Typically, however, this requires the implementation of an a posteriori error estimator to select areas of the discretization grid for refining or for coarsening, a method that, especially in real time, includes complicated data structures to manage sequential grids, which can be burdensome and adversely impact simulation speed.

A much faster approach is to use feedforward based in an initial CT to generate an a priori compressed grid as the non-uniform grid. If further refinement of the non-uniform grid is desired then an adaptive mesh method using an a posteriori error estimator method can be used with the a priori compressed grid as the starting point, as opposed to starting with a uniform grid.

For example, scatter simulation can be accelerated by using an a priori compressed grid in the spatial domain, $\vec{r}$, for each of the first-scatter flux, multiple-scatter flux, and total scatter flux. According to an embodiment, and with reference again to FIG. 5C and FIG. 5D, the present disclosure describes an a priori compressed grids approach, wherein a uniform spatial discretization grid 517 can be compressed such that a refined or coarsened spatial discretization grid 518 can be generated. These compressed grids can reflect a variety of heterogeneous structures and the anticipated scatter patterns of X-rays, such that scatter estimation computation resources can be allocated to provide the desired precision with the fewest computations.

In certain implementations, a library of a priori compressed grids is generated with respect to various patient sizes, for example. This library can be generated in advance by performing an adaptive mesh method that uses an a posteriori error estimator to find the optimal non-uniform grid for scatter simulation, and storing the optimal non-uniform grids together with the corresponding CT image. When a new CT scan is performed, this library can then be used as a lookup table by finding a CT image from the library that best matches a new CT image generated for the new CT scan (e.g., the best match can be performed by scaling and registering the CT images from the library with the new CT scan to determine the best match). Then the optimal non-uniform grid corresponding to the matching CT image from the library is used as the a priori compressed grid for the scatter simulation of the new CT scan. When applicable, the optimal non-uniform grid of the matching CT image from the library can be scaled and registered to provide a best match with the new CT image/scan.

Figure 5E:
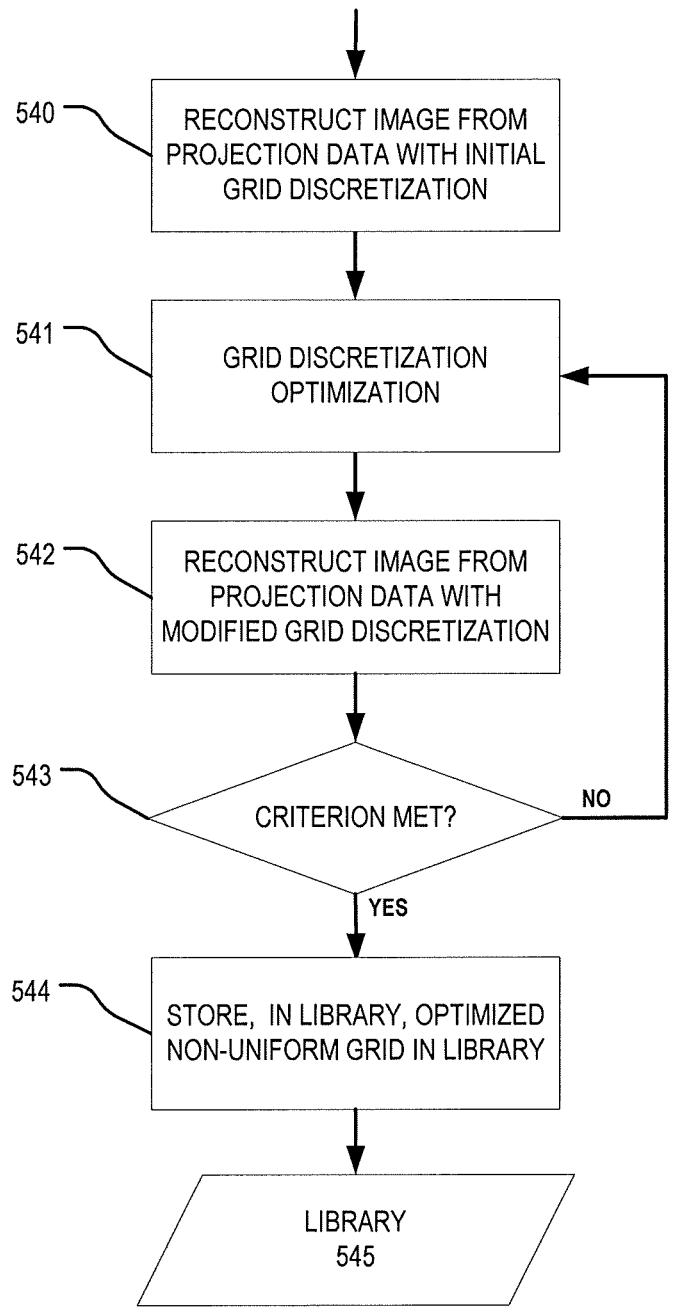
FIG. 5E is a flowchart of a method for generating a library of a priori compressed grids for scatter simulation, according to an exemplary embodiment of the present disclosure.

FIG. 5E shows a flow chart of a non-limiting example of the above-described method for generation of a priori compressed grids for scatter simulation. According to an embodiment, a library of referenceable compressed grids can be generated such that, during real-time scatter simulation, an optimal compressed grid can be deployed, eliminating the need for exhaustive a posteriori discretization grid generation and optimization. In an example, the library of referenceable compressed grids includes optimized spatial discretization grids that can be associated with extractable features of a reference object. Accordingly, in building the library of referenceable compressed grids, a range of objects, including bodies of humans or phantoms, representing a range of tissue and material types, sizes, and densities, among other features, can be selected. In an embodiment, the referenceable compressed grid can be associated with one or more features of a corresponding reference object. For example, one of the one or more features of the corresponding reference object can be a contour of an organ, a Hounsfield Unit (HU), or a known tissue value such that, in real-time implementation, the feature can be identified in an experimental CT scan and matched with an optimized, compressed grid in the referenceable library. In this way, an optimal spatial discretization grid can be deployed for real-time scatter estimations based upon prior simulations.

In developing a library 545 of a priori compressed grids, projection data from CT scans of various reference objects/patients can be used to reconstruct initial CT images, at step 540. Further, for a given CT scan and the corresponding initial CT image, a spatially discretized model of the scatter cross-section $f(\vec{r}',E,E',\hat{\Omega}\cdot\hat{\Omega}')$ can be generated from the initial CT image, and this scatter cross-section f is generated using an initial spatial discretization grid. The initial spatial discretization grid can be a uniform spatial discretization grid of a known resolution. At step 541, local adjustments are performed to the spatial discretization grid to optimize an a posteriori error estimate. This step can be skipped during a first iteration when no a poseriori error estimate has been generated. At step 542, a scatter simulation is performed using the adjusted spatial discretization grid, and a new a posteriori error estimate is generated. In an example, the modified spatial discretization grid resembles the compressed grid observed in FIG. 5B. At step 543, having generated the a posteriori error estimate based on the scatter simulation, an evaluation of a criterion is evaluated to determine convergence to an optimal non-uniform grid. When the evaluation/convergence criterion (e.g., the length of time of image reconstruction) is not satisfied, the method returns to step 541 and optimization continues. Otherwise, the optimization of the non-uniform grid is complete, and the method continues to step 544, in which the initial CT image and the optimized non-uniform grid are stored in the library 545 to be used latter for generating an a priori compressed grid. These steps 540-544 can be repeated for each of the CT scans in the library 545.

According to an embodiment, each compressed grid within the referenceable library 545 can be indexed with one or more labels. Each of the one or more labels can reflect one or more attributes/features including, e.g., a contour of an organ, a Hounsfield Unit, a tissue type, a clinical application, a patient size, and the like. In an example, one of the one or more labels associated with the compressed grid can be hepatic tissue. The hepatic tissue may be identified, for instance, via classification approaches based upon contour segmentation, Hounsfield Units, and the like. Having identified the hepatic tissue, a corresponding compressed grid in the library 545 can be selected and deployed in generation of the object model.

Figure 5F:
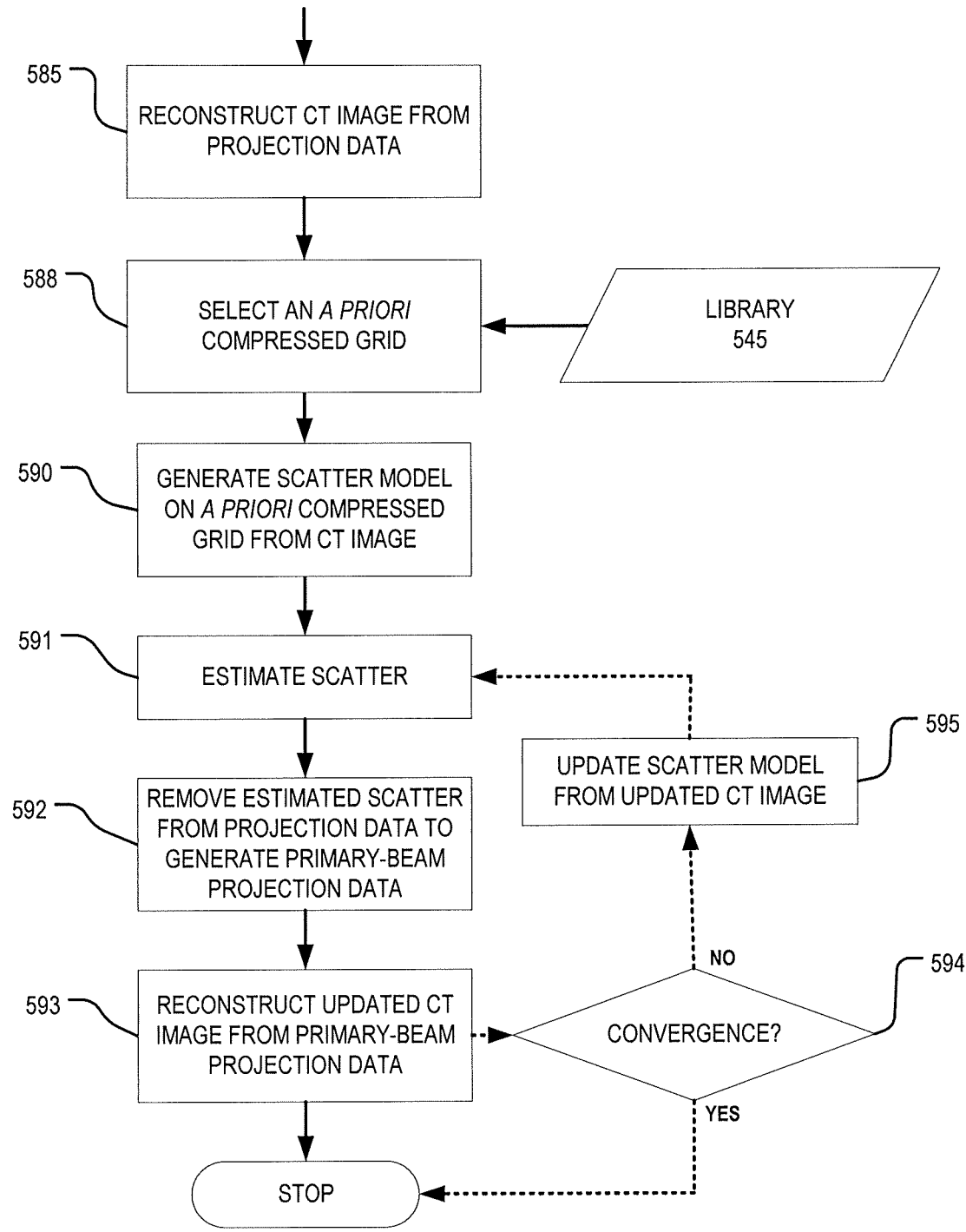
FIG. 5F is a flowchart of development and implementation of an a priori compressed grid for scatter simulation, according to an exemplary embodiment of the present disclosure.

In selecting the appropriate corresponding compressed grid, one or more features of an experimental image must be identified by the process described in FIG. 5F. At step 585, projection data from a new CT scan is obtained and a new CT image is reconstructed from the projection data. Next, at step 586, the new CT image is compared to CT images in the library 545 to select an a priori compressed spatial discretization grid.

In certain implementations, instead of pairs of CT images and optimized non-uniform grids, the library 545 includes a mapping and/or rules for determining a non-uniform spatial grid from a CT image. For example, a trained neural network is a non-limiting example of a mapping from a CT image to a non-uniform spatial grid.

Other rules/mapping might be based on segmenting the CT image into organ/tissue types and applying different grid resolutions/pixel pitches according to bulk regions of particular tissue types (e.g., fine resolution in bone, medium resolution in water, and coarse resolution in air) and other resolutions at boundaries or sharp edges between regions/tissue types. Another rule/mapping might use a piecewise function of the Hounsfield Units to map from the CT image to a pixel pitch for the grid.

Thus, in certain implementations, the reconstructed CT image can be segmented such that features can be extracted and an a priori compressed spatial discretization grid can be generated for the segmented CT image. In an example, the extracted features include macro-level and micro-level features, from organ, hard tissue and soft tissue classification to the rate of change in per-pixel values of, e.g., Hounsfield Units. Feature segmentation and classification can be performed via a variety of machine learning techniques as would be understood by one of ordinary skill in the art. These machine learning techniques include neural networks, support vector machines, and the like. Having identified relevant features within the reconstructed image, the same features can be identified within the library of referenceable compressed grids and the corresponding optimized spatial discretization grid can be selected at step 588 for implementation within a set of CT scan projection data.

According to an embodiment, having selected an optimized spatial discretization grid at step 588 of FIG. 5F, the selected compressed grid can be used to generate a scatter cross-section model $f(\vec{r}',E,E',\hat{\Omega}\cdot\hat{\Omega}')$, at step 590.

Next at step 591, a scatter simulation is performed to estimate the scatter flux, $\psi_s(\vec{r},E,\hat{\Omega})$.

Then at step 592, the estimated scatter can then be removed from the projection data via techniques understood by one of ordinary skill in the art including summation, multiplication, and the like. Having removed the estimated scatter from the projection data, the primary-beam projection data remains, and, at step 593, an updated CT image can be reconstructed from the primary-beam projection data. This updated CT image reflects the X-ray attenuation/radiodensity of the patient in the absence of scatter artifacts.

Because this updated CT image has improved image quality relative to the initial CT image, the updated CT image can optionally be used, at step 595, to update the scatter model $f(\vec{r}',E,E',\hat{\Omega}\cdot\hat{\Omega}')$ by updating the values on the a priori compressed spatial discretization grid. Then steps 591-593 can be repeated to refine the updated CT image by using a more accurate scatter model to generate a more accurate scatter estimate. Moreover, this loop can be repeated multiple times until the estimated scatter flux and the updated CT image converge to a final value. The inquiry whether the solution has converged is performed in step 594 using predefined convergence criteria.

According to an embodiment, following reconstruction of the image via the modified projection data at step 593, an evaluation can be performed to determine a convergence of the reconstructed image in order to improve the object model and the scatter estimation therefrom. For example, at step 594, an evaluation can be made of an initial reconstruction and a subsequent reconstruction, wherein a determined difference between the reconstructions is a convergence value. When the convergence value is above a predetermined level, meaning that significant updates can still be made to the scatter model, the method proceeds to step 595 and the scatter model f is updated, and used to step 591 to estimate the scatter flux using the updated scatter model f.

Now a method is described for accelerating the calculation of the scatter flux by using different resolution for the angular discretization. For example, higher resolution can be used for the narrow angular acceptance window of a detector with and anti-scatter grid than the angular resolution $\Delta\varphi'$ and $\Delta\theta'$ used for scatter between points within the scattering object OBJ. For example, the scatter between points within the scattering object OBJ can be calculated as $$\psi_s^{k+1}(r_n = r'_0, E, \hat{\Omega}) = \psi_1(r_n, E, \hat{\Omega}) +$$

$$\Delta r' \Delta\varphi' \Delta\theta' \sum_{r'_j=\Delta r'}^{r'_{END}} \sum_{\varphi'_m=\Delta\varphi'}^{2\pi} \sum_{\theta'_p=\Delta\theta'}^{\pi} \int dE' f(r'_j \theta'_m, \varphi'_p, E, E', \hat{\Omega} \cdot \hat{\Omega}')$$

$$\psi_s^k(r'_j, \theta'_m, \varphi'_p, E', \hat{\Omega}') \exp\left[-\int_{\{r'_j; \theta'_m, \varphi'_p\}}^{r_n} d\vec{r}'' \mu(\vec{r}'', E)\right],$$

whereas the scatter flux at the detector can be expressed as $$\psi_s(r_D = R'_0, E) = \Delta\Phi\Delta\Theta \sum_{\Phi_m=\Delta\Phi}^{\pi} \sum_{\Theta_p=-\Theta_A/2}^{\Theta_A/2-\Delta\Theta} R_{ASG}(E, \hat{\Omega})$$

$$\int\int d\vec{r}' d\hat{\Omega}' \int dE' f(\vec{r}', E, E', \hat{\Omega} \cdot \hat{\Omega}') [\psi_s^{k+1}(\vec{r}', E', \hat{\Omega}') +$$

$$\psi_0(\vec{r}', E', \hat{\Omega}')] \exp - \int_{\vec{r}'}^{r_D} d\vec{r}'' \mu(\vec{r}'', E),$$

wherein $\hat{\Omega}(\Phi_m, \Theta_p)$ is the solid angle from the coordinates $\{\Theta'_m, \Phi'_p\}$ to point $r_D$, $R_{ASG}(E, \hat{\Omega})$ is the factor accounting for the effects of the ASG, the $\Theta_A$ is the acceptance angle of the detector, which can be restricted by the aspect ratio of an ASG, and the use of the discretized variables $\Theta'_m$ and $\Phi'_p$, instead of $\theta'_m$ and $\varphi'_p$, emphasizes that the resolution of the angular discretization can be different. For example, whereas the angular sum for $\psi_s^{k+1}(r_n)$ is over $4\pi$ steradians, the angular sum for $\psi_s(r_D)$ is restricted to the acceptance angle $\Theta_A$, and a finer discretization can be used for the angular sum (i.e., $\Delta\Theta' < \Delta\theta'$).

Figure 6A:
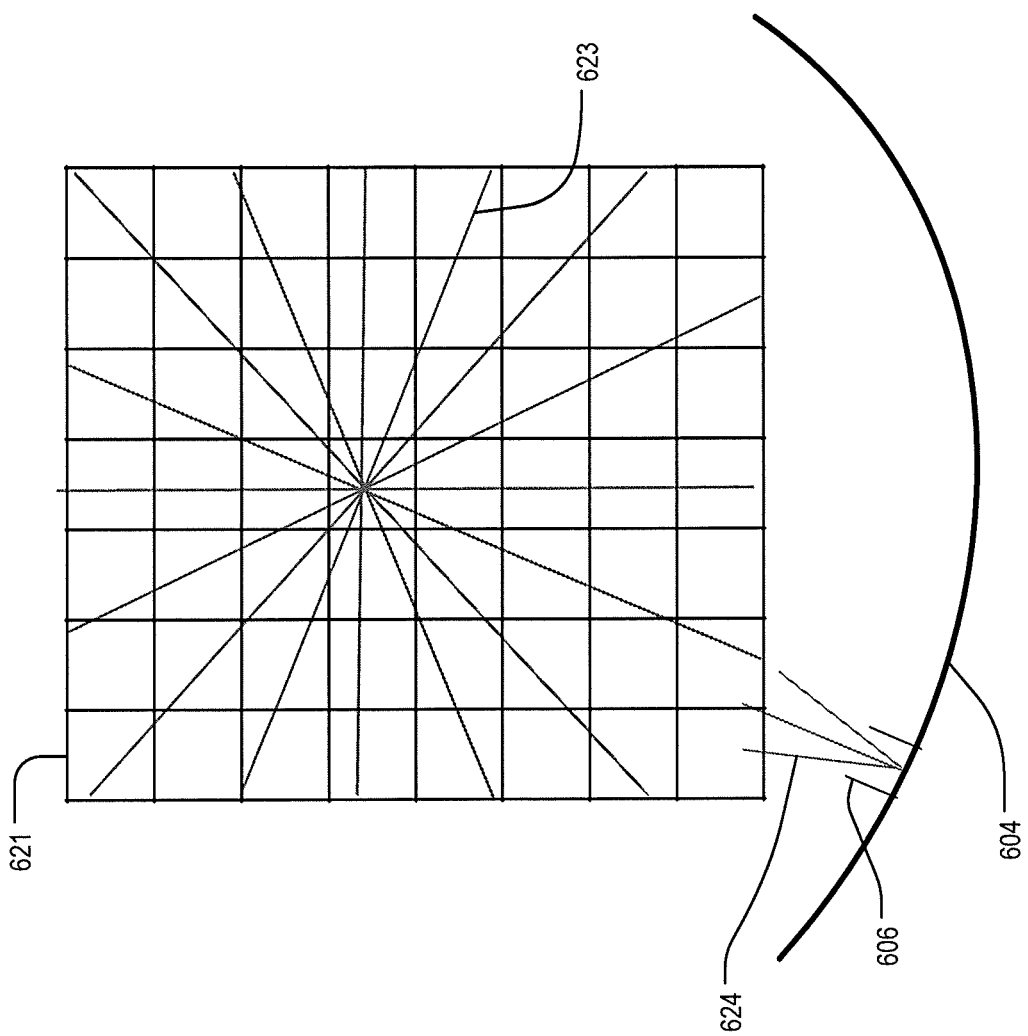
FIG. 6A is a schematic of a dual-resolution angle discretization system for scatter simulation, according to an exemplary embodiment of the present disclosure.

According to an embodiment, the present disclosure is related to an acceleration method in the angular domain that can be applied to first-scatter flux, multiple-scatter flux, and total scatter flux. Generally, an object can be discretized in the angular domain via dual-resolution angle discretization (e.g., a first/coarse angular resolution for scatter among points within a patient/object OBJ and a second/fine angular resolution for the scatter incident on a detector). In certain implementations, this dual-resolution angular discretization can include increasing angular resolution of scatter flux at the detectors and decreasing angular resolution of scatter flux within the object. Specifically, this means that angular resolution can be dependent upon a solid angle such that finer or coarser resolution is implemented when the angular resolution most affects the accuracy/precision of a scatter simulation. FIG. 6A illustrates a non-liming example of a dual-resolution angular discretization method that can be applied to a system including a discretized object 621 in Cartesian coordinates. In determining a first-scatter flux and a multiple-scatter flux in an object 621, discretization depends upon a solid angle or, for example, $4\pi$ solid angle, wherein a larger solid angle of the scatter can be discretized using a coarser resolution. In comparison, at a detector 604, or plurality of detectors, the object/scatterer occupies a limited range (i.e., reduced solid angle) of the detectors, and this limited range can be further restricted by the geometry of the detectors. Therefore, the detectors have a reduced solid angle for which they can accept and detect X-rays. The presence of an anti-scatter grid 606 further reduces the solid angle, thus allowing for a higher, or finer, resolution during angular discretization.

Therefore, in certain implementations, a dual-resolution angular discretization method is used wherein first-scatter and multiple-scatter in an object are discretized at a first angular resolution and total scatter flux at the detector 604 is discretized at a second angular resolution. In other words, angular discretization of first-scatter flux, $\psi_1(\vec{r}, E, \hat{\Omega})$, and multiple-scatter flux, $\psi_s^k(\vec{r}, E, \hat{\Omega})$, can be performed at a first resolution of $\hat{\Omega}$ and total scatter flux at the detector, $\psi_s(\vec{r}_D, E)$, can be performed at a second resolution of $\hat{\Omega}$, the resulting first-scatter flux and multiple-scatter flux being interpolated during integration with the determined total scatter flux at the detector.

Figure 6B:
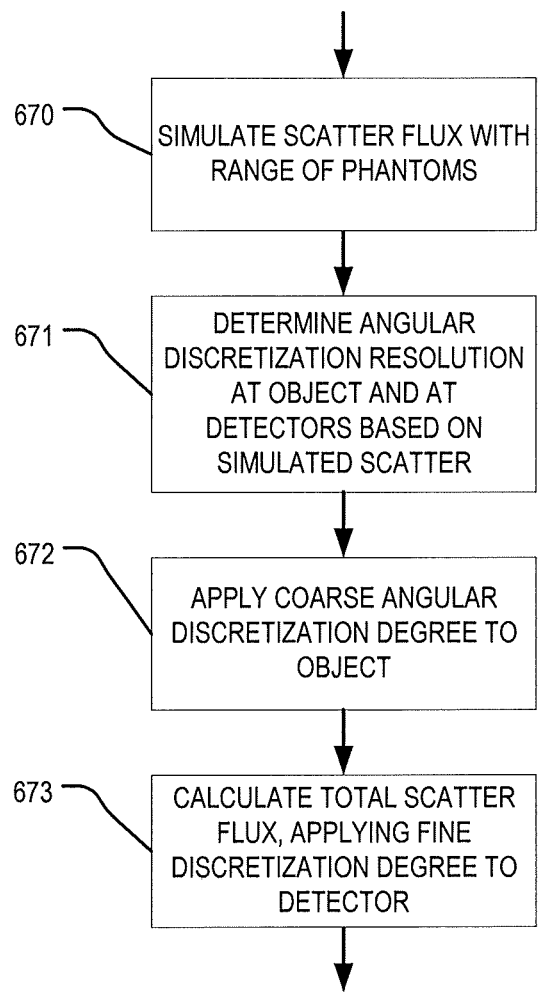
FIG. 6B is a flowchart of a development and implementation of a dual-resolution angle discretization system for scatter simulation, according to an exemplary embodiment of the present disclosure.

The above-described angular discretization approach is described in the flowchart of FIG. 6B. At steps 670 and 671, angular resolutions can be determined, in advance, for the angular resolutions of the discretizations within the object OBJ and at the detectors. For example, repeated simulations can be performed to determine the angular resolutions that provide a desired precision with the fewest number of calculations.

At step 670, scatter-flux simulations are performed for a plurality of phantoms, wherein the phantoms have known sizes and compositions, such that a range of anticipated scatter profiles can be understood.

At step 671, the scatter-flux simulations from step 670 are used to determine angular resolutions to discretize the fields converging to points within the object OBJ and to the detectors, respectively. The respective angular resolutions can be selected in advance of a CT scan and image reconstruction to provide a desired level of precision, while minimizing/reducing a number of calculations/computations. In an embodiment, the respective resolutions of the angular discretizations can depend on the presence or absence of an anti-scatter grid and can depend on an angular acceptance angle of the anti-scatter grid and/or the detectors. These angular resolutions can be determined in advance and stored until they are needed for a scatter simulation in response to projection data from a CT scan.

At steps 672 and 673, a scatter simulation for a CT scan is performed using the dual angular resolutions. Having determined the degree of discretization within the object and at the detectors, angular discretization can be applied for scatter simulation of an object OBJ, which is imaged via a CT scan. For example, at step 672, the first, coarse angular discretization can be applied during steps 226 and 227 of flow diagram in FIG. 2, and, at step 673, the second, fine angular discretization can be applied during step 229 of flow diagram in FIG. 2. Accordingly, within the object, a large solid angle and coarse resolution are used. While, at the detectors, the second, fine angular discretization can be applied. The detector often detect X-ray converging within a smaller solid angle. Implementations applying a dual-resolution angular discretization method, as described above, can maintain precision while improving simulation speed.

Now an acceleration technique is provided that uses a non-uniform discretization of the energy E'. According to an embodiment, the present disclosure is related to an acceleration method in the energy domain that can be applied to first-scatter flux, multiple-scatter flux, and total scatter flux. A better understanding of this acceleration technique can be obtained by noting that, during photon capture, fast simulation speed can be achieved by reducing the dimension in the energy domain via, for instance, energy binning. For example, uniform energy binning can be used. However, X-ray attenuation is not uniform with respect to X-ray energy, suggesting that scatter simulation using non-uniform energy bins might perform better than using uniform energy bins. For example, FIG. 7A shows the X-ray attenuation as a function of energy for water 776 and cortical bone 775, respectively.

Figure 7A:
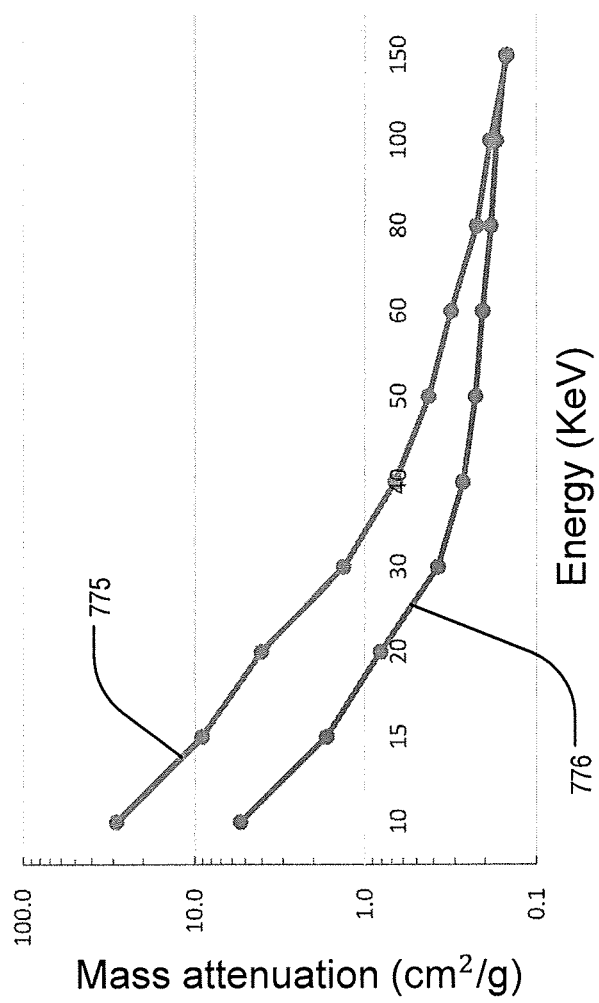
FIG. 7A is a plot of X-ray attenuation as a function of energy for cortical bone and water, according to an exemplary embodiment of the present disclosure.

More particularly, FIG. 7A shows that the mass attenuation of water 776 may be dramatically lower than the mass attenuation of, for example, cortical bone 775 at low energy levels, but at higher energy levels the mass attenuation of water 776 and the mass attenuation of cortical bone 775 may become nearly identical. Thus, the precision of a scatter simulation is less affected by the energy resolution at high X-ray energies compared to the energy resolution at low X-ray energies. That is, at low X-ray energies, the scatter simulation is more sensitive the energy and the material giving rise to the scatter. Therefore, improved scatter-simulation performance can be achieved through using a non-uniform energy discretization.

In certain implementations, a non-uniform energy binning is used during the scatter simulations to maintain simulation precision while reducing the energy dimension and number of calculations. For example, a fine resolution is used for the energy discretization at low X-ray energies E, and a coarse resolution is used for the energy discretization at high X-ray energies E. In certain implementations, the choice of energy resolution as a function of X-ray energy is determined empirically. For example, a series of scatter simulations can be performed in advance of a CT scan, and a non-uniform energy binning can be determined that generates a desired level of precision while reducing the number of computations. Then, this non-uniform energy binning can be applied for scatter simulations to correct subsequent CT scans. Further, the dynamic energy binning method can be developed with pre-simulation across a specific X-ray spectrum such that energy levels of interest can be identified for specific tissues or other matter.

Figure 7B:
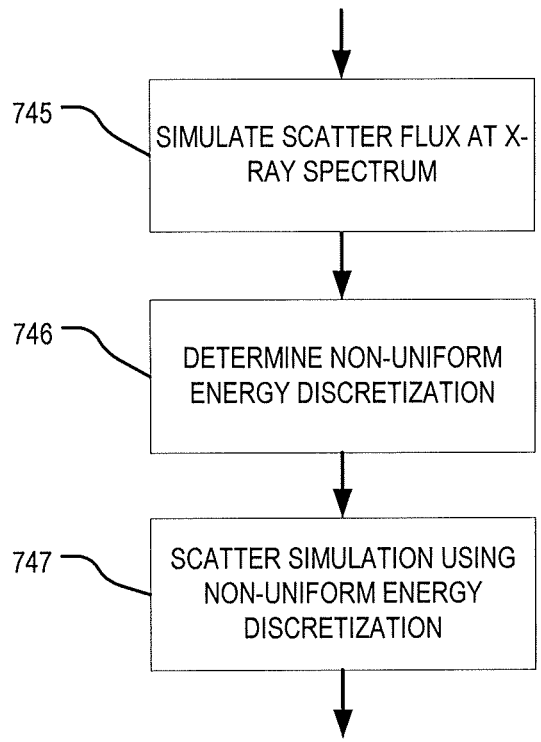
FIG. 7B is a flowchart of a development and implementation of a non-uniform energy discretization system for scatter simulation, according to an exemplary embodiment of the present disclosure.

FIG. 7B shows a flowchart illustrating a non-limiting example of performing scatter simulations using non-uniform energy binning. At steps 745 and 746, scatter simulations are performed using various non-uniform energy binning to determine a distribution of energy bins that produces a desired precision with a reduced a number of calculations. At step 745, the scatter simulations are performed using various non-uniform energy binning. Then, at step 746, the improved/optimal non-uniform energy binning is determined for faster scatter simulations while preserving accuracy. The improved/optimal non-uniform energy binning can be determined and then stored in memory, in advance of a CT scan and scatter simulation/correction.

At step 747, the non-uniform energy binning is used to perform a scatter simulation. For example, the scatter simulation can be performed using the method shown in FIG. 2.

Figure 8:
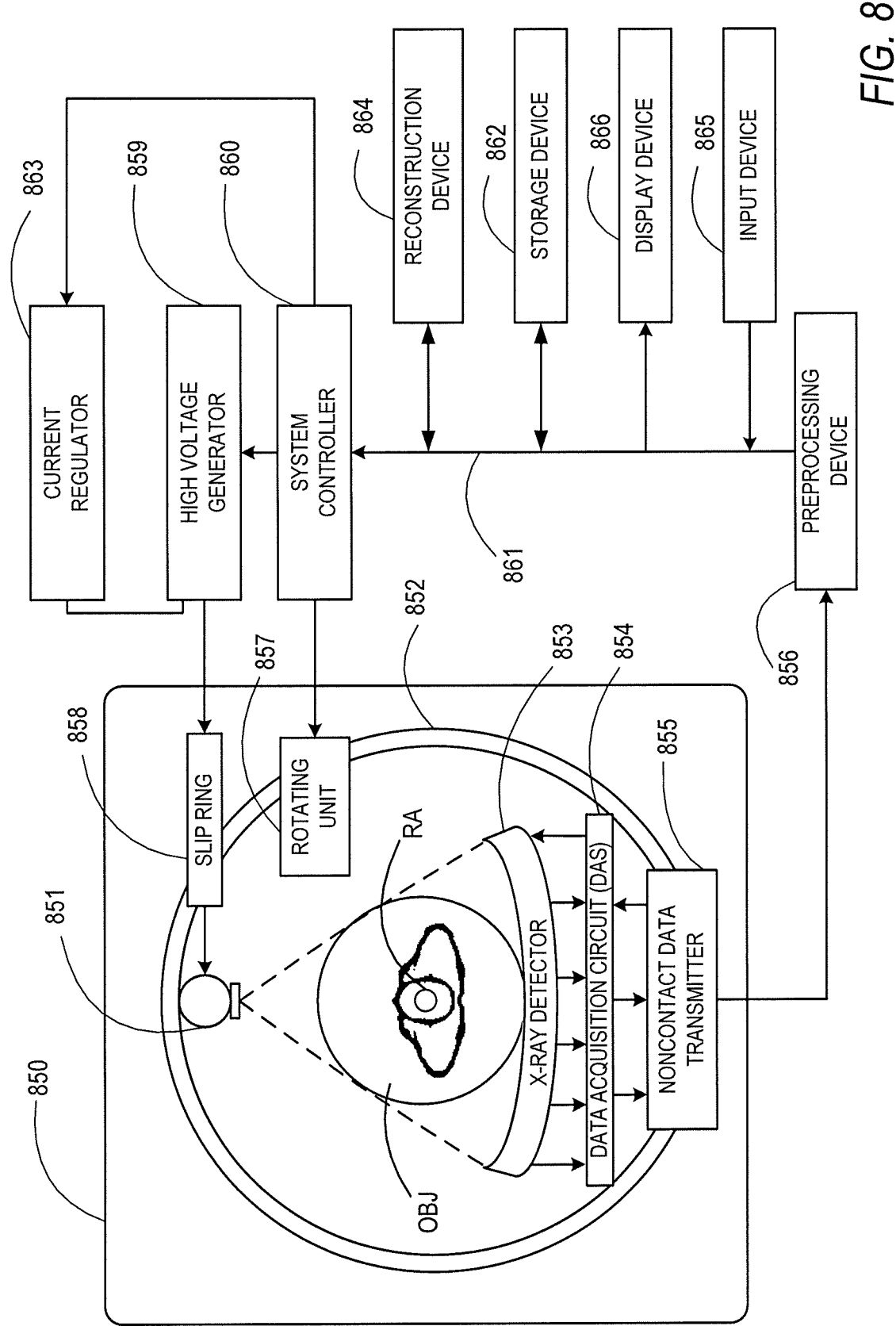
FIG. 8 is a schematic of an implementation of a computed tomography scanner, according to an exemplary embodiment of the present disclosure.

According to an embodiment of the present disclosure, the above-described accelerations methods can be implemented in solving the RTE as applied to raw data from a CT apparatus or scanner. FIG. 8 illustrates an implementation of a radiography gantry included in a CT apparatus or scanner. As shown in FIG. 8, a radiography gantry 850 is illustrated from a side view and further includes an X-ray tube 851, an annular frame 852, and a multi-row or two-dimensional-array-type X-ray detector 853. The X-ray tube 851 and X-ray detector 853 are diametrically mounted across an object OBJ on the annular frame 852, which is rotatably supported around a rotation axis RA. A rotating unit 857 rotates the annular frame 852 at a high speed, such as 0.4 sec/rotation, while the object OBJ is being moved along the axis RA into or out of the illustrated page.

An embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate-type, which is currently the mainstream, will be exemplified.

The multi-slice X-ray CT apparatus further includes a high voltage generator 859 that generates a tube voltage applied to the X-ray tube 501 through a slip ring 858 so that the X-ray tube 851 generates X-rays. The X-rays are emitted towards the object OBJ, whose cross-sectional area is represented by a circle. For example, the X-ray tube 851 having an average X-ray energy during a first scan that is less than an average X-ray energy during a second scan. Thus, two or more scans can be obtained corresponding to different X-ray energies. The X-ray detector 853 is located at an opposite side from the X-ray tube 851 across the object OBJ for detecting the emitted X-rays that have transmitted through the object OBJ. The X-ray detector 853 further includes individual detector elements or units.

The CT apparatus further includes other devices for processing the detected signals from the X-ray detector 853. A data acquisition circuit or a Data Acquisition System (DAS) 854 converts a signal output from the X-ray detector 853 for each channel into a voltage signal, amplifies the signal, and further converts the signal into a digital signal. The X-ray detector 853 and the DAS 854 are configured to handle a predetermined total number of projections per rotation (TPPR).

The above-described data is sent to a preprocessing device 856, which is housed in a console outside the radiography gantry 850 through a non-contact data transmitter 855. The preprocessing device 856 performs certain corrections, such as sensitivity correction, on the raw data. A memory 862 stores the resultant data, which is also called projection data at a stage immediately before reconstruction processing. The memory 862 is connected to a system controller 860 through a data/control bus 861, together with a reconstruction device 864, input device 865, and display 866. The system controller 860 controls a current regulator 863 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 851 and the X-ray detector 853 are diametrically mounted on the annular frame 852 and are rotated around the object OBJ as the annular frame 852 is rotated about the rotation axis RA. In the fourth-generation geometry system, the detectors are fixedly placed around the patient and an X-ray tube rotates around the patient. In an alternative embodiment, the radiography gantry 850 has multiple detectors arranged on the annular frame 852, which is supported by a C-arm and a stand.

The memory 862 can store the measurement value representative of the irradiance of the X-rays at the X-ray detector unit 853. Further, the memory 862 can store a dedicated program for executing the CT image reconstruction, material decomposition, and scatter estimation and correction methods including methods of FIG. 3, FIG. 4B, FIG. 5B, FIG. 6B, FIG. 7B, and FIG. 8B, described herein.

The reconstruction device 864 can execute the above-referenced methods, described herein. Further, reconstruction device 864 can execute pre-reconstruction processing image processing such as volume rendering processing and image difference processing as needed.

The pre-reconstruction processing of the projection data performed by the preprocessing device 856 can include correcting for detector calibrations, detector nonlinearities, and polar effects, for example.

Post-reconstruction processing performed by the reconstruction device 864 can include filtering and smoothing the image, volume rendering processing, and image difference processing, as needed. The image reconstruction process can be performed using filtered back projection, iterative image reconstruction methods, or stochastic image reconstruction methods. The reconstruction device 864 can use the memory to store, e.g., projection data, reconstructed images, calibration data and parameters, and computer programs.

The reconstruction device 864 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VDHL, Verilog, or any other hardware description language and the code may be stored in an electronic memory directly within the FPGA or CPLD, or as a separate electronic memory. Further, the memory 862 can be non-volatile, such as ROM, EPROM, EEPROM or FLASH memory. The memory 862 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 864 can execute a computer program including a set of computer-readable instructions that perform the functions described herein, the program being stored in any of the above-described non-transitory electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft 10, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 866. The display 866 can be an LCD display, CRT display, plasma display, OLED, LED or any other display known in the art.

The memory 862 can be a hard disk drive, CD-ROM drive, DVD drive, FLASH drive, RAM, ROM or any other electronic storage known in the art.

Embodiments of the present disclosure may also be as set forth in the following parentheticals.

(1) An apparatus, comprising processing circuitry configured to obtain projection data representing an intensity of X-ray radiation transmitted through an object and detected at a plurality of detectors, the projection data being obtained for a plurality of views corresponding to respective projection angles relative to the object, reconstruct, using the projection data, an image of the object to generate a spatial model of X-ray scatter from the object, simulate, for one or more views of the plurality of views, a scatter flux of the one or more views representing an intensity of scattered X-ray radiation detected a the plurality of detectors, the intensity of scattered X-ray radiation being determined using an accelerated method based on integrating a radiative transfer equation (RTE), and determine, using the simulated scatter flux of the one or more views, primary flux of the plurality of views, the primary flux representing an intensity of X-rays that have not been scattered, which are incident on the plurality of detectors, wherein simulating the scatter flux is accelerated, relative to methods that use a uniform discretization of the RTE, by non-uniformly discretizing the RTE.

(2) The apparatus according to (1), wherein the simulating the scatter flux includes non-uniformly discretizing the RTE by using a first resolution for an angular discretization of the scatter flux that is between points within the object, and using a second resolution for an angular discretization of the scatter flux that is incident on the plurality of detectors, wherein the first resolution is coarser than the second resolution.

(3) The apparatus according to either (1) or (2), wherein the simulating the scatter flux includes non-uniformly discretizing spatial coordinates of the RTE.

(4) The apparatus according to any of (1) to (3), wherein scattering points within the object are discretized using Cartesian coordinates and X-ray flux converging to the scattering points are discretized using spherical coordinates.

(5) The apparatus according to any of (1) to (4), wherein the simulating the scatter flux includes simulating a first-order scatter flux using a first resolution for spatial discretization of the RTE, and simulating a higher-order scatter flux using a second resolution for the spatial discretization of the RTE, wherein the second resolution is coarser than the first resolution.

(6) The apparatus according to any of (3) to (5), wherein the simulating the scatter flux includes mapping from the reconstructed image of the object to a spatially-varying resolution for a spatial discretization of the spatial model of X-ray scatter.

(7) The apparatus according to (6), wherein the spatially-varying resolution depends on one or more of (i) a radiodensity of the reconstructed image of the object, (ii) a material decomposition of the reconstructed image of the object, (iii) a segmentation of the reconstructed image of the object, and (iv) image processing of the reconstructed image of the object.

(8) The apparatus according to either (6) to (7), wherein the mapping from the reconstructed image of the object to the spatially-varying resolution is based on a plurality of non-uniform grids corresponding to respective training images and respective scatter models derived from the training images, each of the plurality of non-uniform grids being obtained using an adaptive mesh method that locally coarsens and/or refines a resolution within respective regions of the respective nonuniform grid, which discretizes a respective scatter model of the scatter models, to find a spatially-varying resolution corresponding to the respective training image that maintains a predefined precision for a scatter simulation while reducing a number of computations in the scatter simulation.

(9) The apparatus according to any of (1) to (8), wherein the simulating the scatter flux includes non-uniformly discretizing an energy coordinate of the RTE.

(10) The apparatus according to (9), wherein a first resolution is used to discretize the energy coordinates corresponding to a first X-ray energy, and a second resolution is used to discretize the energy coordinates corresponding to a second X-ray energy, wherein the first resolution is coarser than the second resolution and the first X-ray energy is greater than the second X-ray energy.

(11) An apparatus, comprising an X-ray source configured to radiate X-rays through an object space configured to accommodate an object to be imaged, a plurality of detector elements arranged across the object space and opposite to the X-ray source, the plurality of detector elements being configured to detect the X-rays from the X-ray source, and the plurality of detector elements configured to generate projection data representing an intensity of the radiated X-rays, and processing circuitry configured to reconstruct, using the projection data, an image of the object to generate a spatial model of X-ray scatter from the object, simulate, for one or more views of the plurality of views, a scatter flux of the one or more views representing an intensity of scattered X-ray radiation detected a the plurality of detectors, the intensity of scattered X-ray radiation being determined using an accelerated method based on integrating a radiative transfer equation (RTE), and determine, using the simulated scatter flux of the one or more views, primary flux of the plurality of views, the primary flux representing an intensity of X-rays that have not been scattered, which are incident on the plurality of detectors, wherein simulating the scatter flux is accelerated, relative to methods that use a uniform discretization of the RTE, by non-uniformly discretizing the RTE.

(12) A method, comprising obtaining, by processing circuitry, projection data representing an intensity of X-ray radiation transmitted through an object and detected at a plurality of detectors, the projection data being obtained for a plurality of views corresponding to respective projection angles relative to the object, reconstructing, by the processing circuitry and using the projection data, an image of the object to generate a spatial model of X-ray scatter from the object, simulating, by the processing circuitry, for one or more views of the plurality of views, a scatter flux of the one or more views representing an intensity of scattered X-ray radiation detected at the plurality of detectors, the intensity of scattered X-ray radiation being determined using an accelerated method based on integrating a radiative transfer equation (RTE), and determining, by the processing circuitry and using the simulated scatter flux of the one or more views, primary flux of the plurality of views, the primary flux representing an intensity of X-rays that have not been scattered, which are incident on the plurality of detectors, wherein simulating the scatter flux is accelerated, relative to methods that use a uniform discretization of the RTE, by non-uniformly discretizing the RTE.

(13) The method according to (12), wherein the simulating the scatter flux further comprises non-uniformly discretizing, by the processing circuitry, the RTE by using a first resolution for an angular discretization of the scatter flux that is between points within the object, and using a second resolution for an angular discretization of the scatter flux that is incident on the plurality of detectors, wherein the first resolution is coarser than the second resolution.

(14) The method according to either (12) or (13), wherein the simulating the scatter flux further comprises non-uniformly discretizing, by the processing circuitry, spatial coordinates of the RTE.

(15) The method according to any of (12) to (14), wherein scattering points within the object are discretized using Cartesian coordinates and X-ray flux converging to the scattering points are discretized using spherical coordinates.

(16) The method according to any of (12) to (15), wherein the simulating the scatter flux further comprises simulating, by the processing circuitry, a first-order scatter flux using a first resolution for spatial discretization of the RTE, and simulating, by the processing circuitry, a higher-order scatter flux using a second resolution for the spatial discretization of the RTE, wherein the second resolution is coarser than the first resolution.

(17) The method according to any of (12) to (16), wherein the simulating the scatter flux further comprises mapping, by the processing circuitry, from the reconstructed image of the object to a spatially-varying resolution for a spatial discretization of the spatial model of X-ray scatter.

(18) The method according to any of (12) to (17), wherein the spatially-varying resolution depends on one or more of (i) a radiodensity of the reconstructed image of the object, (ii) a material decomposition of the reconstructed image of the object, (iii) a segmentation of the reconstructed image of the object, and (iv) image processing of the reconstructed image of the object.

(19) The method according to any of (12) to (18), wherein the mapping from the reconstructed image of the object to the spatially-varying resolution is based on a plurality of non-uniform grids corresponding to respective training images and respective scatter models derived from the training images, each of the plurality of non-uniform grids being obtained using an adaptive mesh method that locally coarsens and/or refines a resolution within respective regions of the respective non-uniform grid, which discretizes a respective scatter model of the scatter models, to find a spatially-varying resolution corresponding to the respective training image that maintains a predefined precision for a scatter simulation while reducing a number of computations in the scatter simulation.

(20) The method according to any of (12) to (19), wherein the simulating the scatter flux further comprises non-uniformly discretizing, by the processing circuitry, an energy coordinate of the RTE, the non-uniform discretization including discretizing the energy coordinates corresponding to a first X-ray energy at a first resolution and discretizing the energy coordinates corresponding to a second X-ray energy at a second resolution, the first resolution being coarser than the second resolution, the first X-ray energy being greater than the second X-ray energy.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
processing circuitry configured to
obtain projection data representing an intensity of X-ray radiation transmitted through an object and detected at a plurality of detectors, the projection data being obtained for a plurality of views corresponding to respective projection angles relative to the object,
reconstruct, using the projection data, an image of the object to generate a spatial model of X-ray scatter from the object,
simulate, for one or more views of the plurality of views, a scatter flux representing an intensity of scattered X-ray radiation in the projection data, the intensity of scattered X-ray radiation being determined by non-uniformly discretizing a radiative transfer equation (RTE), and
determine, using the simulated scatter flux of the one or more views, primary flux of the one or more views of the plurality of views, the primary flux representing an intensity of X-rays that have not been scattered, which are incident on the plurality of detectors.

2. The apparatus according to claim 1, wherein the simulating the scatter flux includes non-uniformly discretizing one or more of the list of (i) an energy coordinate of the RTE, (ii) one or more angular coordinates of the RTE, and (iii) spatial coordinates of the RTE.

3. The apparatus according to claim 2, wherein, when the one or more angular coordinates of the RTE are non-uniformly discretized, the simulating the scatter flux includes non-uniformly discretizing the RTE by
using a first resolution for an angular discretization of the scatter flux that is between points within the object, and
using a second resolution for an angular discretization of the scatter flux that is incident on the plurality of detectors, wherein
the first resolution is coarser than the second resolution.

4. The apparatus according to claim 2, wherein, when the spatial coordinates of the RTE are non-uniformly discretized, scattering points within the object are discretized using Cartesian coordinates and X-ray flux converging to the scattering points are discretized using spherical coordinates.

5. The apparatus according to claim 2, wherein, when the spatial coordinates of the RTE are non-uniformly discretized, the simulating the scatter flux includes
simulating a first-order scatter flux using a first resolution for spatial discretization of the RTE, and
simulating a higher-order scatter flux using a second resolution for the spatial discretization of the RTE, wherein the second resolution is coarser than the first resolution.

6. The apparatus according to claim 2, wherein, when the spatial coordinates of the RTE are non-uniformly discretized, the simulating the scatter flux includes mapping from the reconstructed image of the object to a spatially-varying resolution for a spatial discretization of the spatial model of X-ray scatter.

7. The apparatus according to claim 6, wherein the spatially-varying resolution depends on one or more of (i) a radiodensity of the reconstructed image of the object, (ii) a material decomposition of the reconstructed image of the object, (iii) a segmentation of the reconstructed image of the object, and (iv) image processing of the reconstructed image of the object.

8. The apparatus according to claim 6, wherein the mapping from the reconstructed image of the object to the spatially-varying resolution is based on a plurality of non-uniform grids corresponding to respective training images and respective scatter models derived from the training images, each of the plurality of non-uniform grids being obtained using an adaptive mesh method that locally coarsens and/or refines a resolution within respective regions of the respective non-uniform grid, which discretizes a respective scatter model of the scatter models, to find a spatially-varying resolution corresponding to the respective training image that maintains a predefined precision for a scatter simulation while reducing a number of computations in the scatter simulation.

9. The apparatus according to claim 2, wherein, when the energy coordinate of the RTE is non-uniformly discretized, the simulating the scatter flux further includes that
a first resolution is used to discretize a part of the energy coordinate corresponding to a first X-ray energy, and
a second resolution is used to discretize a part of the energy coordinate corresponding to a second X-ray energy, wherein
the first resolution is coarser than the second resolution and the first X-ray energy is greater than the second X-ray energy.

10. An apparatus, comprising:
an X-ray source configured to radiate X-rays through an object space configured to accommodate an object to be imaged;
a plurality of detector elements arranged across the object space and opposite to the X-ray source, the plurality of detector elements being configured to detect the X-rays from the X-ray source, and the plurality of detector elements configured to generate projection data representing an intensity of the radiated X-rays, the projection data being obtained for a plurality of views corresponding to respective projection angles relative to the object; and
processing circuitry configured to
reconstruct, using the projection data, an image of the object to generate a spatial model of X-ray scatter from the object,
simulate, for one or more views of the plurality of views, a scatter flux of the one or more views representing an intensity of scattered X-ray radiation detected at the plurality of detectors, the intensity of scattered X-ray radiation being determined by non-uniformly discretizing a radiative transfer equation (RTE), and
determine, using the simulated scatter flux of the one or more views, primary flux of the one or more views of the plurality of views, the primary flux representing an intensity of X-rays that have not been scattered, which are incident on the plurality of detectors.

11. A method, comprising:
obtaining, by processing circuitry, projection data representing an intensity of X-ray radiation transmitted through an object and detected at a plurality of detectors, the projection data being obtained for a plurality of views corresponding to respective projection angles relative to the object;

reconstructing, by the processing circuitry and using the projection data, an image of the object to generate a spatial model of X-ray scatter from the object;

simulating, by the processing circuitry, a scatter flux representing an intensity of scattered X-ray radiation in the projection data, the intensity of scattered X-ray radiation being determined by non-uniformly discretizing a radiative transfer equation (RTE); and determining, by the processing circuitry and using the simulated scatter flux, a primary flux representing an intensity of X-rays that have not been scattered which are incident on the plurality of detectors.

12. The method according to claim 11, wherein the simulating the scatter flux further comprises non-uniformly discretizing one or more of the list of (i) an energy coordinate of the RTE, (ii) one or more angular coordinates of the RTE, and (iii) spatial coordinates of the RTE.

13. The method according to claim 12, wherein, when the one or more angular coordinates of the RTE are non-uniformly discretized, the simulating the scatter flux further comprises non-uniformly discretizing the RTE by using a first resolution for an angular discretization of the scatter flux propagating between points within the object, and using a second resolution for an angular discretization of the scatter flux that is incident on the plurality of detectors, wherein the first resolution is coarser than the second resolution.

14. The method according to claim 13, wherein, when the spatial coordinates of the RTE are non-uniformly discretized, scattering points within the object are discretized using Cartesian coordinates and X-ray flux converging to the scattering points are discretized using spherical coordinates.

15. The method according to claim 13, wherein, when the spatial coordinates of the RTE are non-uniformly discretized, the simulating the scatter flux further comprises simulating, by the processing circuitry, a first-order scatter flux using a first resolution for spatial discretization of the RTE, and simulating, by the processing circuitry, a higher-order scatter flux using a second resolution for the spatial discretization of the RTE, wherein the second resolution is coarser than the first resolution.

16. The method according to claim 13, wherein, when the spatial coordinates of the RTE are non-uniformly discretized, the simulating the scatter flux further comprises mapping, by the processing circuitry, from the reconstructed image of the object to a spatially-varying resolution for a spatial discretization of the spatial model of X-ray scatter.

17. The method according to claim 16, wherein, when the spatial coordinates of the RTE are non-uniformly discretized, the spatially-varying resolution depends on one or more of (i) a radiodensity of the reconstructed image of the object, (ii) a material decomposition of the reconstructed image of the object, (iii) a segmentation of the reconstructed image of the object, and (iv) image processing of the reconstructed image of the object.

18. The method according to claim 16, wherein the mapping from the reconstructed image of the object to the spatially-varying resolution is based on a plurality of non-uniform grids corresponding to respective training images and respective scatter models derived from the training images, each of the plurality of non-uniform grids being obtained using an adaptive mesh method that locally coarsens and/or refines a resolution within respective regions of the respective non-uniform grid, which discretizes a respective scatter model of the scatter models, to find a spatially-varying resolution corresponding to the respective training image that maintains a predefined precision for a scatter simulation while reducing a number of computations in the scatter simulation.

19. The method according to claim 12, wherein, when the energy coordinate of the RTE is non-uniformly discretized, the simulating the scatter flux further comprises discretizing a part of the energy coordinate corresponding to a first X-ray energy at a first resolution, and discretizing a part of the energy coordinate corresponding to a second X-ray energy at a second resolution, wherein the first resolution is coarser than the second resolution, the first X-ray energy being greater than the second X-ray energy.

20. A non-transitory computer-readable medium storing executable instructions, wherein the instructions, when executed by processing circuitry, cause the processing circuitry to perform the method according to claim 11.

* * * * *